(12) United States Patent
Zhai

(10) Patent No.: US 11,520,156 B2
(45) Date of Patent: Dec. 6, 2022

(54) MULTI-CHANNELS HIGH BRIGHTNESS LIGHT ENGINE APPARATUS

(71) Applicant: Jinhui Zhai, Union City, CA (US)

(72) Inventor: Jinhui Zhai, Union City, CA (US)

( * ) Notice: Subject to any disclaimer, the term of this patent is extended or adjusted under 35 U.S.C. 154(b) by 251 days.

(21) Appl. No.: 16/870,613

(22) Filed: May 8, 2020

(65) Prior Publication Data

US 2021/0191138 A1  Jun. 24, 2021

Related U.S. Application Data

(60) Provisional application No. 62/953,226, filed on Dec. 24, 2019.

(51) Int. Cl.

| G03B 21/20 | (2006.01) |
| H04N 9/31 | (2006.01) |
| G02B 27/14 | (2006.01) |
| G02B 27/10 | (2006.01) |
| G02B 26/00 | (2006.01) |
| G02B 19/00 | (2006.01) |

(52) U.S. Cl.
CPC ....... *G02B 27/141* (2013.01); *G02B 19/0009* (2013.01); *G02B 19/0066* (2013.01); *G02B 26/008* (2013.01); *G02B 27/1006* (2013.01)

(58) Field of Classification Search
CPC .............. G03B 21/2013; G03B 21/204; G02B 27/141; G02B 27/102; H04N 9/3164
See application file for complete search history.

(56) References Cited

U.S. PATENT DOCUMENTS

| 2012/0327374 A1* | 12/2012 | Kitano | G03B 21/16 |
| | | | 353/31 |
| 2013/0100639 A1* | 4/2013 | Li | G02B 27/149 |
| | | | 362/231 |
| 2014/0293234 A1* | 10/2014 | Lin | G03B 33/12 |
| | | | 353/31 |
| 2016/0298827 A1* | 10/2016 | Jurik | F21V 21/30 |

* cited by examiner

*Primary Examiner* — Ryan D Howard
(74) *Attorney, Agent, or Firm* — Sinorica LLC

(57) ABSTRACT

A high brightness light engine apparatus is disclosed, comprising at least one long red wavelength light source with a peak wavelength longer than 630 nm, at least one green wavelength light source and at least one blue wavelength light source. Furthermore, the long wavelength red light may be combined with short wavelength red light and green/blue lights into a co-axial light path by at least one beam combiner such as wedged dichroic mirror, X-plate dichroic mirror or a dichroic X-cube. A 3-channels/4-channels/5-channels light engine apparatus and a hybrid laser LED light engine apparatus are disclosed that comprises at least a long wavelength red light source, one blue light source, and one converted green light source, combined by a dichroic mirror together with a X-plate dichroic mirror, a wedged dichroic mirror or a dichroic X-cube without Etendue increase to achieve high brightness light engine output as high as 5000 lm.

28 Claims, 13 Drawing Sheets

MULTI-CHANNELS HIGH BRIGHTNESS LIGHT ENGINE APPARATUS

RELATED APPLICATION

This application claims priority to and the benefit of U.S. Provisional Patent Application No. 62/953,226, filed on Dec. 24, 2019, entitled "MULTI-CHANNELS LIGHT ENGINE APPARATUS COMPRISES A LONG WAVELENGTH RED LIGHT SOURCE", which is incorporated herein by reference in its entirety.

TECHNICAL FIELD

The disclosed technology relates to light engine device, and particularly to multi-channels light engine apparatus and hybrid laser LED engine device for high brightness light engine illumination system, which may comprise a long wavelength red light channel, and combines with green and blue channels and/or a short wavelength red light channel into a co-axial light path.

BACKGROUND

The prior art of multi-channels light engine apparatus used R/G/B lights and mixed together for white and brilliant color images. It usually uses short wavelength red LED because human eye is less sensitive to long wavelength red light. So long red wavelength light is not a favorable red wavelength light for current LED projector in term of brightness sacrifice. Most of current existing RGB light engine use short wavelength red LED called red-amber LED with peak wavelength less than 630 nm. But there is so called "green gap" in semiconductor light industry. Green and amber LEDs, with peak wavelengths at approximately 540 nm and 575 nm respectively, are right in the middle of the so-called "green gap", as shown in FIG. 1. Quantum efficiency reduces as the green emission wavelengths are approached, both from the short wavelength and long wavelength sides. Red-amber LEDs currently used in LED projection system are based on aluminum indium gallium phosphide (AlInGaP) materials, and face two challenges. First, AlInGaP-based red LED efficiencies decrease when the red wavelengths go shorter, closer to "green gap", for example red-amber LED at ~620 nm peak wavelength, the ideal red wavelength for lighting, their external quantum efficiencies are only about 25%. Second, the thermal efficiency droop associated with these AlInGaP-based red LEDs is much higher than that associated with InGaN-based blue LEDs. So red-amber LED has big performance degradation at high temperature and high current density, especially when is driven at high duty cycle or continue waveform mode. Accordingly, there is a need to drive short wavelength red-amber LED at low duty cycle to avoid light output droop at high current density, called roll over.

Moreover, there are a couple of configurations recently developed to achieve high brightness output by adding top blue pumping to converted green LEDs or using HLD LED technology by using green phosphor coated rod/tunnel developed by Philips. Both approaches can increase converted green LED brightness by around 50% or more, in this case, when a single wavelength red-amber is used, more duty cycle needs to apply to the red-amber LED, which will suffer high current roll over issue at high red duty cycle, so red LED brightness becomes bottleneck when new top blue pumping and HLD technology have been used in multi-channels light engine configuration. In order to overcome red-amber big droop and thermal degradation issue, phosphor converted red approach is proposed by adding red phosphor plate on top of blue LED die to get phosphor converted red light. Phosphor converted red light can solve the droop and thermal degradation issues of red-amber LED, but it has wide spectral bandwidth with existing stable red phosphor, which may reduce red color saturation and at same time have big dichroic mirror cutting loss when combining with green and blue light during white color mixing in projection light engine. Accordingly, phosphor converted red light can solve thermal degradation issue, but still has drawback of low system efficiency when combining with other wavelengths light using dichroic mirrors due to its wide spectral bandwidth.

Accordingly, there is a need to improve red light channel brightness for high brightness light engine, and furthermore it may need to add another LED with different wavelength red light to increase red channel brightness. As dashed line indicated in FIG. 1, the quantum efficiency is decreased from the blue to the green-yellow (left to right) and from the red to the green-yellow (right to left). However, the quantum efficiency will increase from amber to red and reach peak at around 650~660 nm, which is called deep red light. So deep red LED has the highest quantum efficiency among red light spectral range. Also comparing to red-amber LED, which has peak wavelength around 620 nm, the deep red LED with peak wavelength around 650~660 nm, usually is more thermally stable, and this is because the deep red device semiconductor layers has wider bandgap in quantum wells design. Even though long wavelength red light may have less sensitive to human eye, since its color coordinates (Cx, Cy), especially Cy shift right-down according to CIE 1931 color space chromaticity diagram, less long wavelength red light is needed during white color balance, which keeps green light duty cycle high for high brightness. At same time, color coordinates shifting down will help to improve projection system color gamut. Therefore, deep red light with peak wavelength around 650~660 nm is a good candidate to add into projection light engine so as to increase red channel brightness when combining with short wavelength red-amber light. The advantage of long wavelength deep red light source also includes:

1. Higher quantum efficiency than short wavelength red-amber LEDs
2. Higher thermal stability with higher hot-to-cold factor
3. Less rollover issue at high current density, so it can be driven at very high current
4. Better performance at higher duty cycle comparing to short wavelength red-amber LEDs when combining with current red-amber LED, can solve red light bottleneck in multi-channels light engine In projection system, etendue matching is very important in order to efficiently use the light emitting from the light source, so there is optimal size for LED light in order to couple most of light, usually within 65~75 degrees beam angle, into projection system with micro-display, such DMD. It is very critical to combine multi-channels light into co-axial light path without etendue increase in a projection system. Dichroic mirror combining is a good approach to combine multiple wavelengths, which may reflect certain wavelength range but pass through other wavelength range. It usually includes 30~50 dielectric layers in one dichroic mirror. It is easy to manufacture short-pass or long-pass dichroic mirror, which may reflect or transmit blue light, but pass or reflect longer wavelength green and red light, or reflect red light, but pass blue and green light. It's also relatively easy to manufacture a single band-pass dichroic mirror, but may be difficult to manufacture a multiple band-pass filter. Accordingly, there is a need for a multi-channel light engine apparatus to combine R/G/B light devices, which comprise a long wavelength deep red light device, into co-axial light path by using simple short-pass, long-pass or single band-pass dichroic mirrors for high brightness output.

SUMMARY OF INVENTION

To overcome the bottleneck of red light channel brightness in a green enhanced high brightness light engine, a long wavelength deep red light source is introduced to combine with existing short wavelength red-amber light, and multi-channels light engine configurations are described. The high brightness light engine device is disclosed, comprising a first light source comprising a first green light device configured to emit a green light beam; a second light source comprising a first blue light device configured to emit a blue light beam; a third light source comprising a first red light device configured to emit a red light beam with peak wavelength longer than 630 nm; and a first beam combiner configured to combine the red light beam, the green light beam and the blue light beam so as to form a co-axial light path; wherein the first beam combiner comprises a X-plate dichroic mirror, a wedged dichroic mirror, or a dichroic X-cube, which has multiple-layers of dielectric coating to function as a short-pass dichroic mirror, a long-pass dichroic mirror or a single band-pass dichroic mirror. The light engine device may further comprise a second beam combiner configured to assist the first beam combiner in forming the co-axial light path, wherein the second beam combiner comprises at least one dichroic mirror; the first beam combiner can be split into two dichroic mirrors as the first beam combiner and a third beam combiner, each including multiple layers dielectric coated plate; and wherein the green light beam, the blue light beam and the red light beam will be combined by the first and second or third beam combiners into a co-axis light path without Etendue increase. The peak wavelength of long wavelength red light and short wavelength red light need to be at 25 nm difference to reduce dichroic mirror cutting loss. The light engine device can be configured as 3-channels/4-channels/5-channels light engine so as to achieve light engine output as high as 3000 lm-5000 lm with LED light source. The duty cycle ratio between the green light beam, the enhanced red light beam and the blue light beam will be optimal balanced. The red, green and blue light source or devices could be semiconductor light emitting diodes (LEDs), laser light source, phosphor converted light source, or other semiconductor light source.

The wedged dichroic mirror could be wedged plate and each side of the plate has different dichroic filter coating. The wedged dichroic mirror could be replaced by two dichroic plates, each plate has different dichroic filter coating on one side and the two dichroic plates are deposited at a certain angle. For light combination by the wedged dichroic mirror, the chip to emit the first wavelength light and the chip to emit the second wavelength light are packaged on the same substrate and the light from both wavelength chips will enter into the same light channel for light collimation, but the two wavelength light incident the wedged dichroic mirror at different angles and will be reflected by different sides of wedged dichroic mirror, wherein the wedged dichroic mirror is configured to have a wedged angle, so that the principle axial of two wavelength light beams after reflected from two sides of the wedged dichroic mirror will be overlap into co-axial light channel without etendue increase. The two different wavelength chips could also be packaged on two separated substrates and the light from these two wavelength devices can be combined by a X-plate dichroic mirrors or a dichroic X-cube. The dichroic X-cube, or X-plate dichroic mirror could be replaced by two dichroic mirrors in apparatus. The dichroic filter coating of the wedged dichroic mirror, X-plate dichroic mirrors and standard dichroic mirror in light engine apparatus will be configured to use a long-pass filter, a short-pass filter, or a single band-pass filter for easy manufacturing.

In one aspect, a 3-channel light engine apparatus is disclosed, which may comprise at least one long wavelength red light with deep red peak wavelength longer than 630 nm, at least one green wavelength LED and at least one blue wavelength LED. Furthermore, the red, green, blue LEDs may be combined by dichroic mirror and a dichroic X-plate/Cube into a co-axial light path without etendue increase for light engine output as high as 3000 lm. Furthermore, this light engine apparatus may comprise a short wavelength red-amber LED, and the deep red LED and short wavelength red-amber LED or blue LED may be packaged on a single substrate and combined by a wedged dichroic mirror into a co-axial light path without etendue increase. The dielectric dichroic coating in the dichroic mirror, or X-plate, or wedged dichroic mirror may be a short-pass filter, a long-pass filter or a single band-pass filter.

The green LED device may be phosphor converted green (CG) LED with green phosphor conversion plate directly depositing on top of blue LED die and the blue light pumps the green phosphor plate from the bottom of the green LED device, or remotely top side pumping phosphor conversion green light device with green phosphor deposited on high reflective and thermally conductive substrate, or a converted green rod/pipe with multiple blue LED dies attached to the rod/pipe which have green phosphor coated on a surface of the rod/pipe. The long wavelength red LED may be semi-conductor red LED or phosphor converted red (CR) LED with red phosphor conversion plate directly depositing on top of blue LED die or remotely top side pumping phosphor conversion with red phosphor deposited on high reflective and thermally conductive substrate.

In another aspect, a 4-channel light engine apparatus is disclosed, may comprise at least one long wavelength red light with deep red peak wavelength longer than 630 nm, at least one short wavelength red light with red-amber peak wavelength less than 630 nm, at least one green light wavelength LED and at least one blue wavelength LED. Furthermore, the red, green, blue LEDs may be combined by dichroic mirror and a dichroic X-plate/cube into a co-axial light path without etendue increase for light engine output as high as 3000~4000 lm. The deep red LED and red-amber LED or blue LED may be packaged on a single substrate and combined by a wedged dichroic mirror. The dielectric dichroic coating in the dichroic mirror, or X-plate, or wedged dichroic mirror may be a short-pass filter, a long-pass filter or a single band-pass filter. The green light LED may have phosphor conversion from blue die at the bottom, and/or remotely conversion from top or from light pipe/rod conversion.

In another aspect, a 5-channel light engine apparatus is disclosed, may comprise at least one long wavelength red light with deep red peak wavelength longer than 630 nm, at least one short wavelength red light with red-amber peak wavelength less than 630 nm, at least one converted green wavelength LED, at least one short blue wavelength LED to top pump converted green plate and at least one long wavelength display blue LED. Furthermore, the deep red LED and the red-amber LED may be combined by a dichroic mirror or a dichroic X-plate/cube; the deep red LED and red-amber LED or blue LED may be packaged on a single substrate and combined by a wedged dichroic mirror; the top pump blue LED channel may include a dichroic mirror to separate blue LED light and converted green LED light. The top pump short blue LED light may have peak wavelength of 430~450 nm, the long wavelength display blue LED may have peak wavelength of 445 nm~465 nm. The dielectric dichroic coating in the dichroic mirror, or X-plate, or wedged dichroic mirror may be a short-pass filter, a long-pass filter or a single band-pass filter. The green and red LED may have phosphor conversion from blue die at the bottom, and/or remotely conversion from top or from light pipe/rod conversion. In this 5-channel light engine apparatus, the multiples red, blue and green lights can be combined by dichroic mirror and dichroic X-plate or wedged dichroic mirror into a co-axial light path without etendue increase for light engine output as high as 5000 lm. In a 5-channel light engine configuration, if one or two channels of optics are removed, it can be easily turn into 4-channels configuration and 3-channels configuration.

In another aspect, a hybrid laser LED light engine device for high brightness light engine illumination system is disclosed, may comprise at least one long wavelength red light device with deep red peak wavelength longer than 630 nm, at least one short wavelength red LED with red-amber peak wavelength less than 630 nm, at least one converted green light device and at least one blue laser diode, and at least a first beam combiner configured to combine the red light beam, the green light beam and the blue light beam so as to form a co-axial light path; wherein the first beam combiner comprises a X-plate dichroic mirror, a wedged dichroic mirror, two dichroic mirrors or a dichroic X-cube, which has multiple-layers dielectric coating to be function as a short-pass dichroic filter, a long-pass dichroic filter or a single band-pass dichroic filter; and wherein at least one of the first, the second and the third light sources comprises at least a laser diode configured to emit a laser beam. The deep red LED and the red-amber LED may be combined by a dichroic mirror or a dichroic X-cube; the deep red LED and red-amber LED may be packaged on a single substrate and combined by a wedged dichroic mirror. The converted green channel may have phosphor conversion plate deposit on top of a reflector with blue laser pumping it from the top, or may have phosphor conversion layer coat on a rotation wheel and blue laser light pumps it from the bottom, wherein the color wheel comprises green phosphor segments and blank segments, and the green phosphor segments are configured to emit a green light beam when pumped by blue light, and wherein the area of segments defines the duty cycle for blue, green turning on time in a period.

Therefore, the long wavelength deep red light source will be used to combine with short wavelength red-amber light source by dichroic mirrors into a co-axial path without etendue increase in the light engine system in this invention to overcome red light brightness bottleneck in a green light enhanced high brightness light engine system. The difference between long wavelength red light and short wavelength red light need to have at least 25 nm in wavelength to reduce the dichroic mirror cutting loss. With significant increase of red channel brightness from the combination of a long wavelength red LED and a short wavelength red, the duty cycle for red channel can be significantly reduced, so red-amber LED can be driven at higher current without roll over issue, and duty cycle for green light channel can be significantly increased to achieve light engine brightness as high as 5000 lm. In addition to brightness improvement, long wavelength deep red light can also increase color gamut of projection system. Furthermore, a compact size of light engine apparatus can be achieved by using wedged dichroic mirror or dichroic X-plate/cube and only simple short-pass, long-pass or single band-pass dichroic mirrors are adopted in this invention for high brightness output as the novel configurations of the multi-channel high brightness light engine apparatus.

The scope of the present invention is defined by the claims. A more complete understanding of embodiments of the present disclosure will be afforded to those skilled in the art, as well as a realization of additional advantages thereof, by a consideration of the following detailed description of one or more embodiments.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION OF EMBODIMENTS

Figure 1:
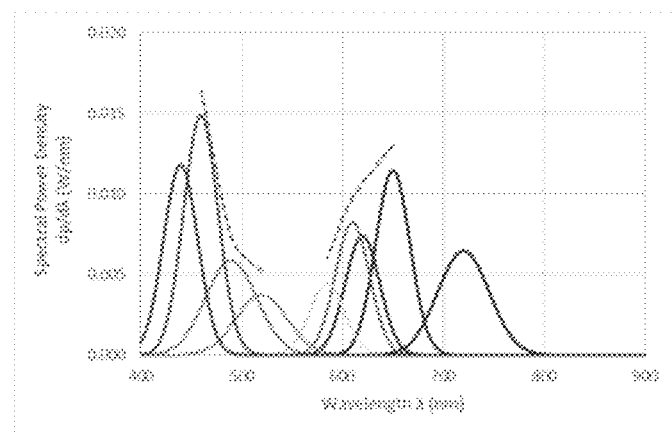
FIG. 1 shows a graph of green droop gap of semiconductor emitting device.
Figure 2:
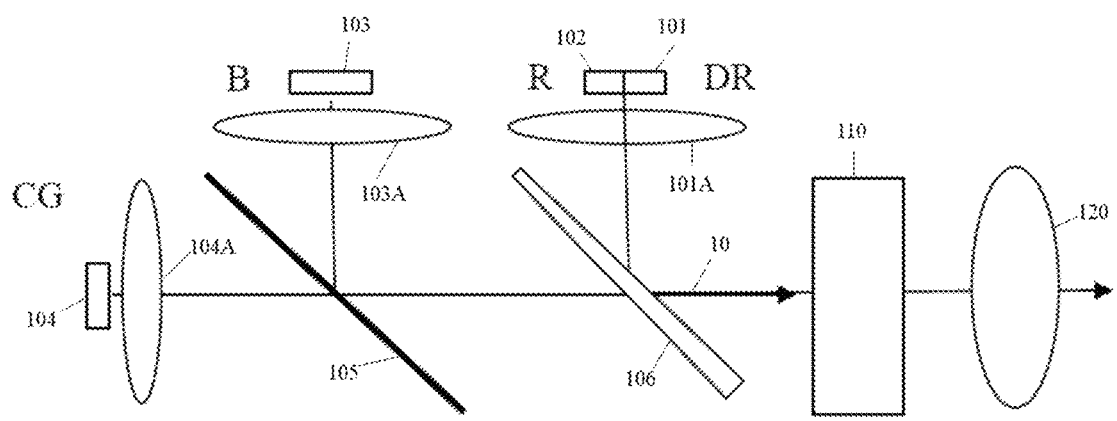
FIG. 2 illustrates the first embodiment of 3-channel light engine apparatus according to the present disclosure.

As the first embodiment of high brightness 3-channel light engine apparatus according to the present invention in FIG. 2, it comprises at least a long wavelength red LED 101 with deep red (DR) peak wavelength of 640~660 nm, a short wavelength red (R) LED 102 with red-amber peak wavelength around 620 nm, a converted green (CG) LED 104 and a blue (B) LED 103, wherein the converted green light emitted from the converted green LED 104 through the lens 104A as the first light channel will be combined with the blue light emitted from the blue LED 103 through the lens 103A as the second light channel by a dichroic mirror 105, and wherein, the deep red LED 101 and the red-amber LED 102 are packaged on a single substrate, the deep red light emitted from the deep red LED 101 and the red-amber red light emitted from the red-amber LED 102 are converged by a lens 101A as the third light channel and then combined by a wedged dichroic mirror 106 into a co-axial light path 10. The peak wavelength of the deep red light needs to be different from that of the amber-red light at no less than 25 nm to so as to reduce dichroic mirror cutting loss. The dielectric dichroic coating of the dichroic mirror 105 is a long-pass filter which reflects short wavelength blue light, but passes through long wavelength green and red light. The dielectric dichroic coating of the wedged dichroic mirror 106 is a short-pass filter which passes through blue and green light, but reflects red light; wherein the top side dielectric coating of the wedge dichroic mirror 106 will pass through blue, green and red-amber wavelength light, but reflect deep red wavelength light, and the bottom side dielectric coating of the wedge dichroic mirror 106 will pass through blue, green wavelength light, but reflect red-amber and deep red wavelength light. The wedged dichroic mirror 106 could be replaced by two dichroic plates deposited at a certain angle and with two different dielectric coatings on one side of each dichroic plate. The combined red LEDs light and combined green/blue light are combined into the co-axial light path 10 without etendue increase so as to form a compact light engine configuration. For light combination by the wedged dichroic mirror 106, as the deep red LED 101 and the red-amber LED 102 are packaged on the same substrate and the light from both LEDs will enter into the same light channel (e.g. lens 101A) for light collimation, but the two different wavelength light beams incident the wedged dichroic mirror at different angles and will be reflected by different sides of the wedged dichroic mirror 106, which is configured to have a wedged angle, so that the principle axis of two different wavelength light beams after reflected from the different sides of the wedged dichroic mirror will overlap into the co-axial light path 10 within 65-75 degree beam angle without etendue increase. The co-axial light path RGB combined light will hit a fly-eye array lens 110 for homogenization before illuminating micro-display panel by a condenser lens 120. When a thermal pipe or vapor channel solution is used for thermal management, this 3-channel light engine apparatus will have a compact size and can be driven at high current density over 4~6A/mm^2 for high brightness light engine output as high as 3000 lm.

Figure 3:
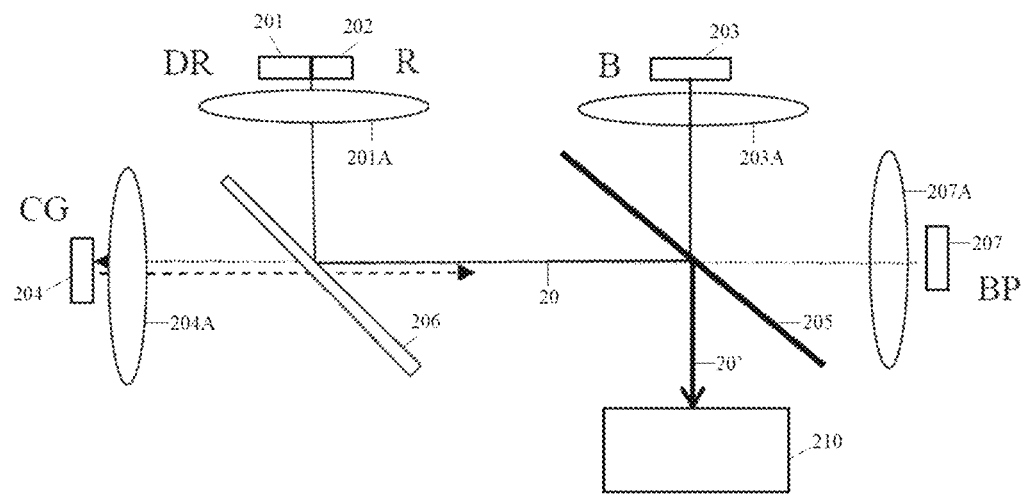
FIG. 3 illustrates the first embodiment of 4-channel light engine apparatus according to the present disclosure.

As the first embodiment of high brightness 4-channel light engine apparatus according to the present invention in FIG. 3, it comprises at least a long wavelength red LED 201 with deep red (DR) peak wavelength of 640~660 nm, a short wavelength red (R) LED 202 with red-amber peak wavelength around 620 nm, a converted green (CG) LED 204, a top pump short wavelength blue (BP) LED 207 and a display blue (B) LED 203, wherein the converted green LED light as the first light channel from the converted green (CG) LED 204 comprises bottom pumped green light from the blue die at the bottom of the CG LED 204 and top pumped green light from the remoted pumping blue light in the second light channel of the blue pump (BP) LED 207 through the lens 207A, and will pass through the lens 204A and the wedged dichroic mirror 206 into the co-axial light path 20. The deep red LED 201 and red-amber LED 202 are packaged on a single substrate, the deep red light emitted from the deep red LED 201 and the red-amber red light emitted from the red-amber LED 202 are converged by a lens 201A as the third light channel and then reflected by a wedged dichroic mirror 206 into co-axial light path 20. The peak wavelength of the deep red light needs to be different from that of the amber-red light at no less than 25 nm to so as to reduce dichroic mirror cutting loss. The converted green LED light and the combined deep red/red-amber light will be reflected by the dichroic mirror 205, but the blue light from the display blue (B) LED 203 as the forth light channel will pass through the dichroic mirror 205, so that the RGB light will be combined into the RGB co-axial light path 20' for a high brightness light engine configuration. The dielectric dichroic coating of the dichroic mirror 205 is a short-pass filter which passes through blue light, but reflects green and red light. The dielectric dichroic coating of the wedged dichroic mirror 206 is also a short-pass filter which passes blue and green light, but reflects red light. For light combination by the wedged dichroic mirror 206, the deep red LED 201 and the red-amber LED 202 are packaged on the same substrate and the light from both LEDs will enter into the same light channel (e.g. lens 201A) for light collimation, but the two different wavelength light beams incident the wedged dichroic mirror 206 at different angles and will be reflected by different sides of the wedged dichroic mirror 206 with corresponding dielectric coatings at the different sides, which is configured to have a wedged angle, so that the principle axial of two different wavelength light beams after reflected from the different sides of the wedged dichroic mirror will overlap into the co-axial light path 20 within 65-75 degree beam angle without etendue increase. The RGB co-axial light path combined light will hit a fly-eye array lens 210 for homogenization before illuminating micro-display panel by a condenser lens (not shown). This 4-channel light engine can be driven at high current density over 4~6A/mm^2 for high brightness light engine output as high as 3000~4000 lm.

Figure 4:
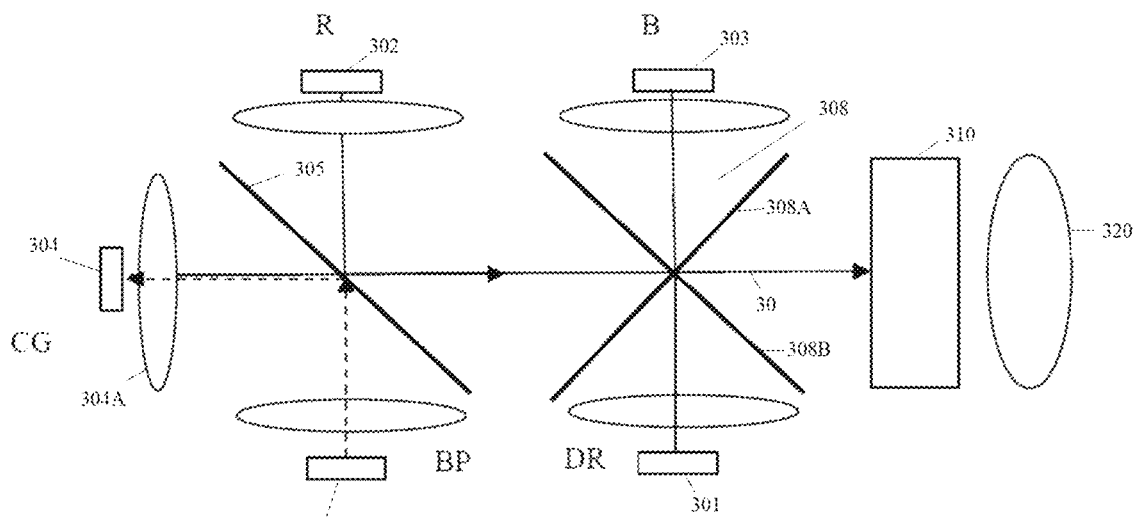
FIG. 4 illustrates the first embodiment of 5-channel light engine apparatus according to the present disclosure.

As the first embodiment of high brightness 5-channel light engine apparatus according to the present invention in FIG. 4, it comprises a long wavelength red LED 301 with deep red (DR) wavelength of 640~660 nm, a short wavelength red (R) LED 302 with red-amber wavelength around 620 nm, a converted green(CG) LED 304 plus a top pump short wavelength blue (BP) LED 307 and a blue(B) wavelength LED 303, wherein, the deep red LED 301 and red-amber LED 302 are packaged on a separate substrate as the first and second light channels respectively, and the peak wavelength of the deep red light needs to be different from that of the amber-red light at no less than 25 nm to so as to reduce dichroic mirror cutting loss. A dichroic mirror 305 is configured to separate converted green light from blue pump light as the fifth light channel which is emitted from the top pump short wavelength blue LED 307. The converted green LED light as the forth light channel from the converted green (CG) LED 304 comprises bottom pumped green light from the blue die at the bottom of the CG LED 304 and top pumped green light from the remoted pumping blue light in the fifth light channel of the blue pump (BP) LED 307, and will pass through the lens 304A and the dichroic mirror 305. The converted green with top pump conversion green light, the red-amber light reflected by the dichroic mirror 305, the deep red light from the deep red LED 301 and the blue light as the third light channel from the blue(B) wavelength LED 303 will be combined by a X-plate dichroic mirror 308 into co-axial light path 30 without etendue increase for a high brightness light engine configuration. The dielectric dichroic coating of the dichroic mirror 305 is a single band-pass filter which reflects blue and red light, but passes through green light. The dielectric dichroic coating of the X-plate dichroic mirror 308 includes a short-pass deep red reflector mirror 308A and a long-pass blue reflector mirror 308B. The co-axial light path RGB combined light will hit a fly-eye array lens 310 for homogenization before illuminating micro-display panel by a condenser lens 320. Alternatively, the blue wavelength LED 303 may have a long blue(LB) wavelength chip of 460~470 nm and a short blue(SB) wavelength chip of 430~440 nm packaged on a same substrate, and the long-pass blue reflector mirror 308B is replaced by a wedged dichroic mirror for combining two blue wavelength lights into a co-axial light path. This 5-channel light engine can be driven at high current density over 4~6A/mm^2 for high brightness light engine output. The illumination light beam will be reflected by a micro-display and through optical prism to enter into projection optical system; wherein the projection light output can achieve high brightness light engine output as high as 5000 lm in a micro-display projection system.

Figure 5:
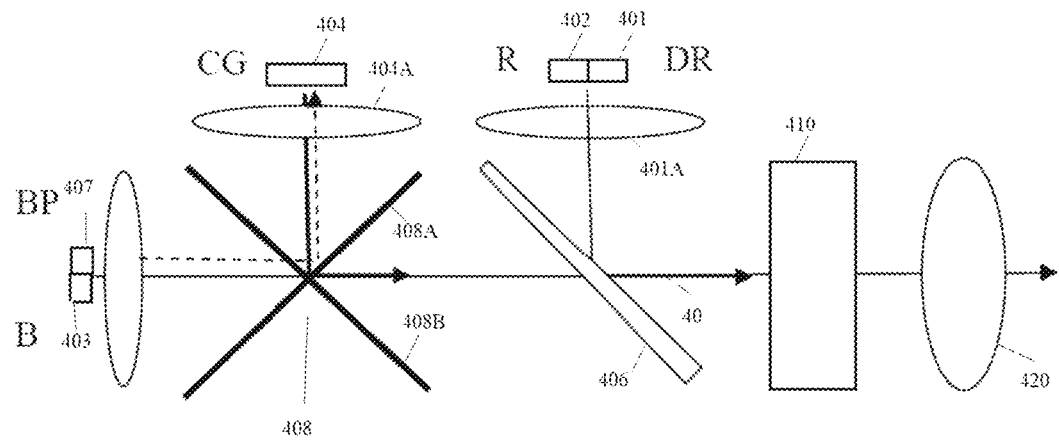
FIG. 5 illustrates an alternative embodiment of 3-channel light engine apparatus according to the present disclosure.

As an alternative embodiment of high brightness 3-channel light engine apparatus according to the present invention in FIG. 5, it comprises at least a long wavelength red LED 401 with deep red(DR) peak wavelength of 640~660 nm, a short wavelength red (R) LED 402 with peak wavelength around 620 nm, a converted green(CG) LED 404, a short wavelength top blue pump(BP) LED 407 and a display blue(B) wavelength LED 403, wherein, the deep red LED 401 and red-amber LED 402 are packaged on a single substrate, the deep red light emitted from the deep red LED 401 and the red-amber light emitted from the red-amber LED 402 are converged by a lens 401A and then and combined by a wedged dichroic mirror 406, and the peak wavelength of the deep red light needs to be different from that of the amber-red light at no less than 25 nm to so as to reduce dichroic mirror cutting loss. For light combination by the wedged dichroic mirror 406, the deep red LED 401 and the red-amber LED 402 are packaged on the same substrate and the light from both LEDs will enter into the same light channel (e.g. lens 401A) for light collimation, but the two different wavelength light beams incident the wedged dichroic mirror 406 at different angles and will be reflected by different sides of the wedged dichroic mirror 406, which is configured to have a wedged angle, so that the principle axial of two different wavelength light beams after reflected from the different sides of the wedged dichroic mirror will overlap into the co-axial light path 40 without etendue increase. The blue pump LED 407 and the display blue LED 403 are packaged on a single substrate. The blue pump light from the blue pump LED 407 is used to remotely pump the green phosphor platelet on the converted green (CG) LED 404 from the top of the platelet and the top pumped green light will be reflected at reflective layer of LED die of the converted green LED and combine together with the bottom pumping converted green LED light, and then the converted green light will be combined with the display blue light by a X-plate dichroic mirror 408 into a co-axial light path. The dielectric dichroic coating of X-plate dichroic mirror 408 includes a long-pass short blue wavelength reflector mirror 408A and a short-pass green light reflector mirror 408B. The dielectric dichroic coating of the wedged dichroic mirror 406 is a short-pass filter which passes blue and green light, but reflects red light. The combined red LEDs light and the combined green/blue light are combined into a co-axial light path 40 without etendue increase. The co-axial light path RGB combined light will hit a fly-eye array lens 410 for homogenization before illuminating micro-display panel by a condenser lens 420.

Figure 6:
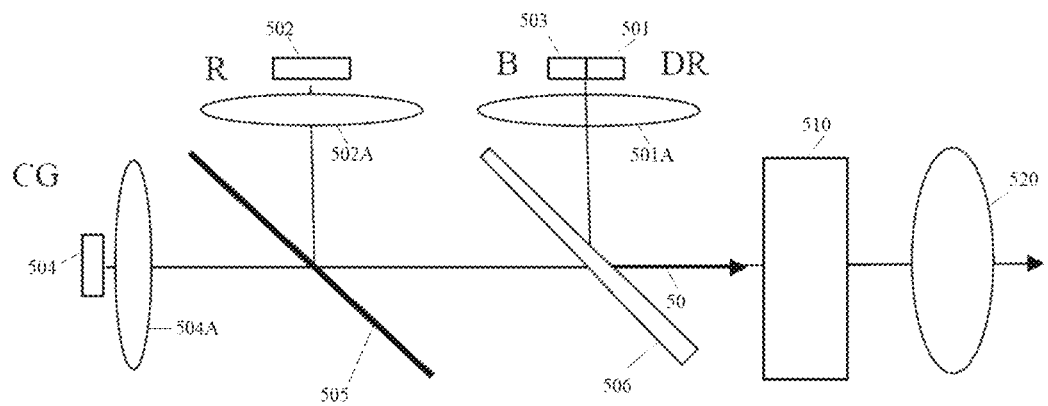
FIG. 6 illustrates another alternative embodiment of 3-channel light engine apparatus according to the present disclosure.

As another alternative embodiment of high brightness 3-channel light engine apparatus according to the present invention in FIG. 6, it comprises at least a long wavelength red (DR) light source 501 with deep red peak wavelength of 640~660 nm, a short red light source 502 with peak wavelength around 620 nm, a converted green (CG) light source 504 and a display blue wavelength light source 503, wherein, the different wavelength light chips may be packaged onto the same substrate and combined by a wedged dichroic mirror into co-axial light path without etendue increase. As shown in FIG. 6, the blue LED die 503 and the deep red LED die 501 are packaged onto a same substrate and combined by a wedged dichroic mirror 506 into co-axial light path 50. For light combination by the wedged dichroic mirror 506, the deep red light source 501 and the display blue light source 503 are packaged on the same substrate and the light from both of them will enter into the same light channel (e.g. lens 501A) for light collimation, but the two different wavelength light beams incident the wedged dichroic mirror 506 at different angles and will be reflected by different sides of the wedged dichroic mirror 606, specifically, the dielectric dichroic coating of the wedged dichroic mirror 506 comprises a short-pass dielectric coating which passes blue, green and red-amber light, but reflects deep red light on one side and a long-pass dielectric coating which passes green and red-amber light, but reflects blue light on other side, so that the principle axial of two different wavelength light beams after reflected from the different sides of the wedged dichroic mirror will overlap into the co-axial light path 50 without etendue increase. The co-axial light path RGB combined light will hit a fly-eye array lens 510 for homogenization before illuminating micro-display panel by a condenser lens 520. The deep red light source could be a deep red LED or semiconductor laser. The converted green light source may be a green phosphor plate directly depositing on top of blue LED die, or converted green rod/pipe with multiple blue LED chips attached to the rod/pipe which have green phosphor coated on the surface.

Figure 7:
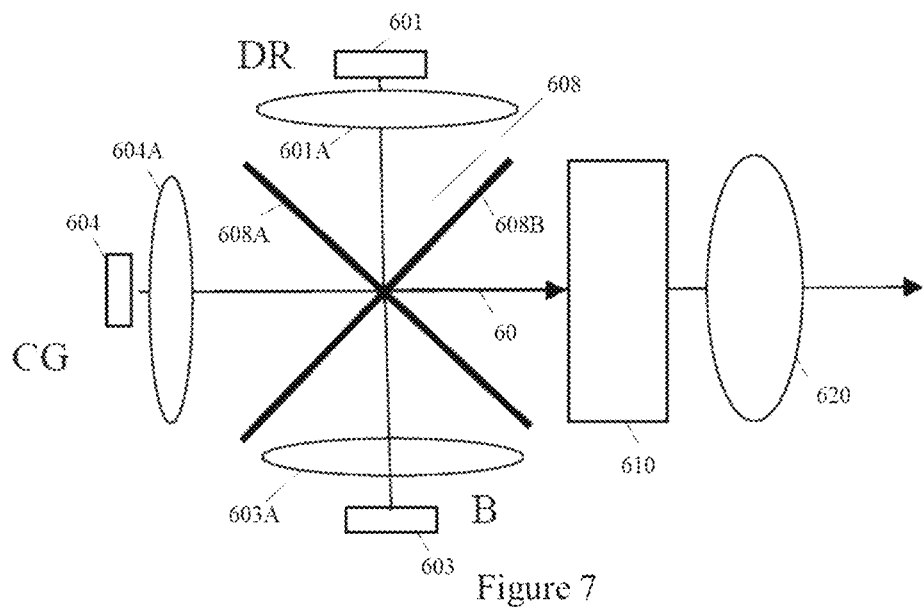
FIG. 7 illustrates another alternative embodiment of 3-channel light engine apparatus according to the present disclosure.
Figure 8:
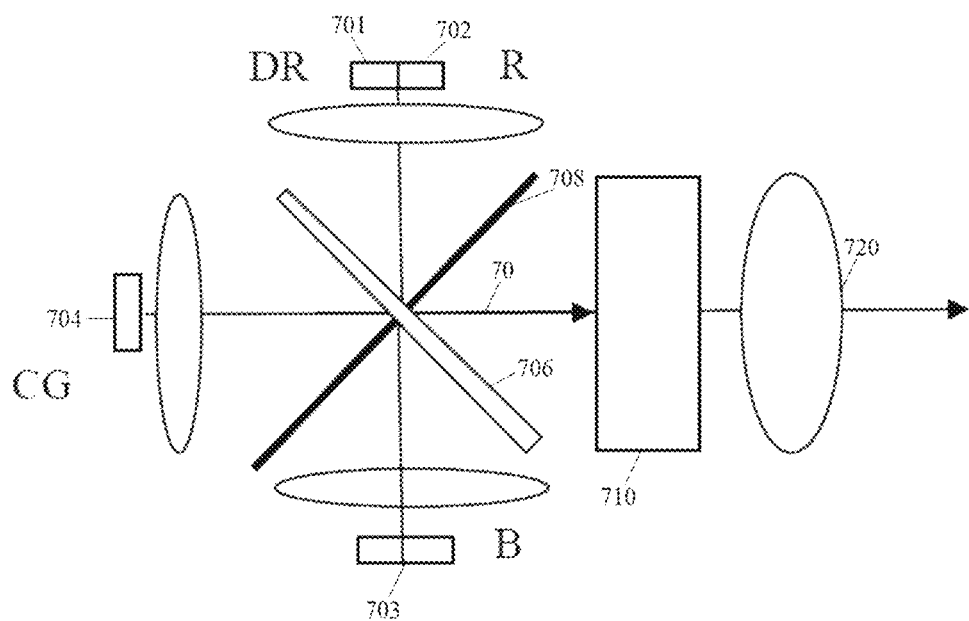
FIG. 8 illustrates another alternative embodiment of 3-channel light engine apparatus according to the present disclosure.

As another alternative embodiment of high brightness 3-channel light engine apparatus according to the present invention in FIG. 7, it comprises at least a long wavelength red (DR) light source 601, a converted green (CG) LED 604, and a blue(B) wavelength LED 603, wherein, the red light, the green light and the blue light are combined by a X-plate dichroic mirror 608 into co-axial light path 60 without etendue increase. The red light source could be a long wavelength red LED with deep red peak wavelength of 640~660 nm, or a red semiconductor laser. Alternatively, the red light source also could be a phosphor converted red LED with long wavelength phosphor plate, and another short wavelength blue light can top pump the phosphor plate. The dielectric dichroic coating of the X-plate dichroic mirror 608 includes a short-pass red reflector mirror 608A and a long-pass blue reflector mirror 608B. The co-axial light path RGB combined light will hit a fly-eye array lens 610 for homogenization before illuminating micro-display panel by a condenser lens 620. Alternatively, as shown in FIG. 8, the red light source could comprise a long wavelength deep red LED die 701 and a short wavelength red-amber(R) chip 702 packaged on the same substrate and is combined with the converted green light from a converted green (CG) light source 704 and the blue light from a blue(B) wavelength LED 703 by a X-plate dichroic mirror 708, of which one mirror may be a wedged mirror 706. The dielectric dichroic coating of the X-plate dichroic mirror 708 includes a long-pass blue reflector mirror, and a wedged dichroic mirror 706 with a short-pass red-amber reflector coating and a deep red reflector coating on different sides of the wedged mirror. The co-axial light path 70 RGB combined light will hit a fly-eye array lens 710 for homogenization before illuminating micro-display panel by a condenser lens 720.

Figure 9:
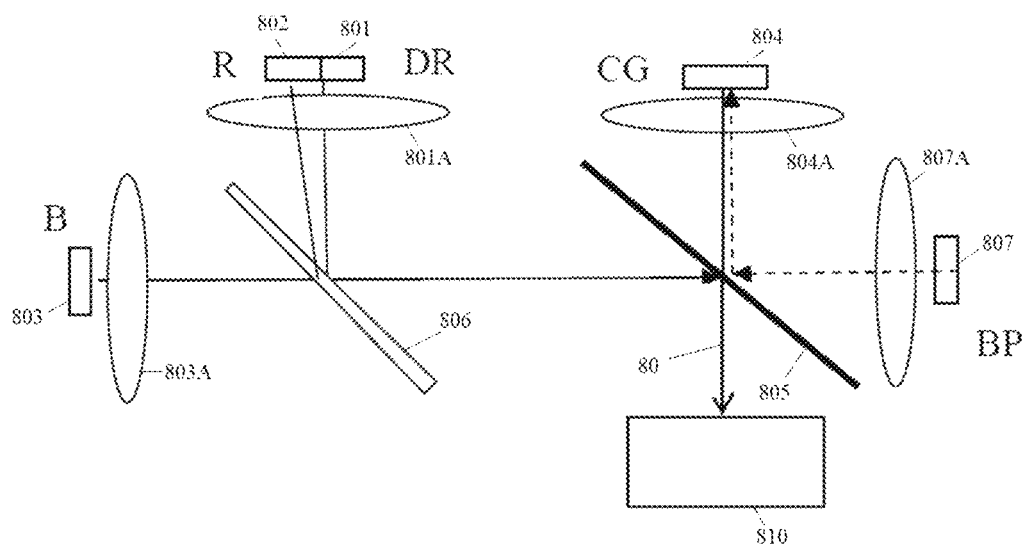
FIG. 9 illustrates an alternative embodiment of 4-channel light engine apparatus according to the present disclosure.

As an alternative embodiment of high brightness 4-channel light engine apparatus according to the present invention in FIG. 9, it comprises at least a long wavelength red LED 801 with deep red (DR) peak wavelength of 640~660 nm, a short wavelength red LED 802 with red-amber(R) peak wavelength around 620 nm, a converted green(CG) LED 804, a blue pump (BP) LED 807 and a blue(B) LED 803, wherein, the deep red LED 801 and the red-amber LED 802 are packaged on a single substrate, the deep red light emitted from the deep red LED 801 and the red-amber light emitted from the red-amber LED 802 are converged by a lens 801A and then will be combined with display blue LED light emitted from the blue(B) LED 803 by a wedged dichroic mirror 806. The blue light emitted from the blue pump (BP) LED 807 is reflected by a dichroic mirror 805 and top pumped the bottom blue die of the converted green (CG) LED 804 so as to emit the converted green LED light from the converted green (CG) LED 804, and then the converted green light will pass through the lens 804A and the dichroic mirror 805. The display blue light is emitted from the blue(B) LED 803 and converged by a lens 803A, with passing through the wedged dichroic mirror 806. The combined deep red/display blue light/red-amber light and the converted green light will be combined by a dichroic mirror 805 to have co-axial light path for a high brightness light engine configuration. The dielectric dichroic coating of the wedged dichroic mirror 806 comprises a short-pass dielectric coating which passes blue, green light and reflects red light. The dielectric dichroic coating of the dichroic mirror 805 comprises a single band-pass dielectric coating. The co-axial light path RGB combined light will hit a fly-eye array lens 810 for homogenization before illuminating micro-display panel by a condenser lens (not shown).

Figure 10:
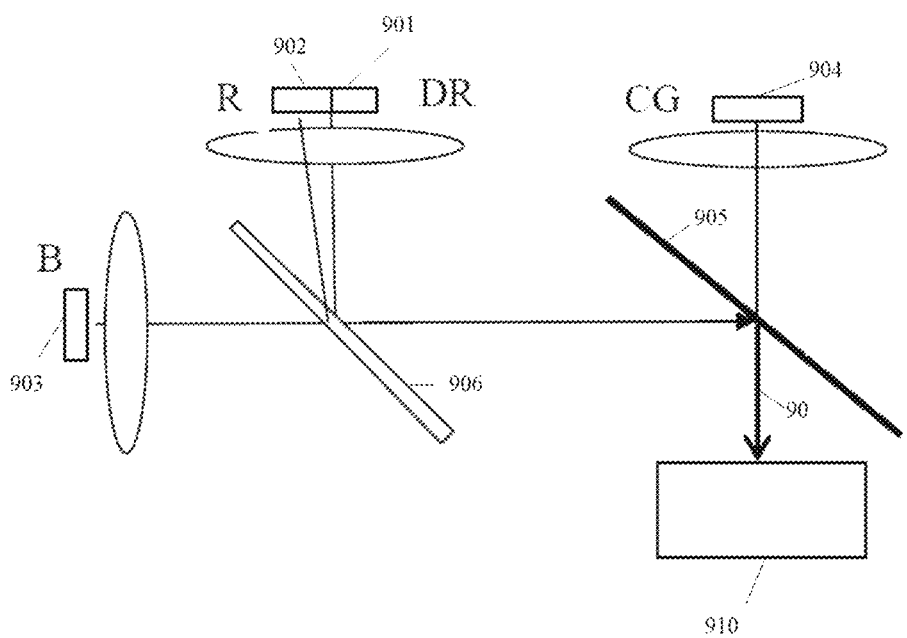
FIG. 10 illustrates another alternative embodiment of 3-channel light engine apparatus according to the present disclosure.
Figure 11:
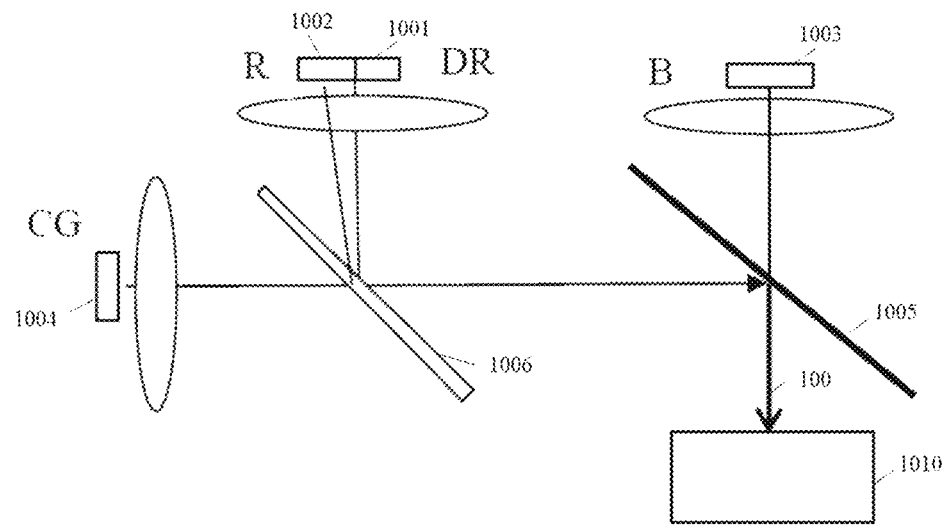
FIG. 11 illustrates another alternative embodiment of 3-channel light engine apparatus according to the present disclosure.

As an alternative, the deep red LED and the display blue LED may be packaged on a single substrate and be combined with red-amber LED light by a wedged dichroic mirror. In this configuration, if no blue pump LED channel is needed, then it will become a 3-channel configuration as in FIG. 10. The deep red LED die 901 and red-amber LED die 902 may be packaged on a single substrate and combined with blue light from a blue wavelength LED 903 by a wedged dichroic mirror 906, and then combine with the converted green LED light from the converted green (CG) LED 904 by a dichroic mirror 905 into co-axial light path 90 for a high brightness light engine configuration. The co-axial light path RGB combined light will hit a fly-eye array lens 910 for homogenization. As another alternative embodiment of the 3-channel light engine apparatus, the deep red LED die 1001 and red-amber LED die 1002 may be packaged on a single substrate and combined with the converted green light from the converted green (CG) LED 1004 by a wedged dichroic mirror 1006, and then combine with the blue light from a blue wavelength LED 1003 by a dichroic mirror 1005 into co-axial light path 100 for a high brightness light engine configuration, as illustrated in FIG. 11, the co-axial light path RGB combined light will hit a fly-eye array lens 1010 for homogenization before illuminating micro-display panel by a condenser lens(not shown).

Figure 12:
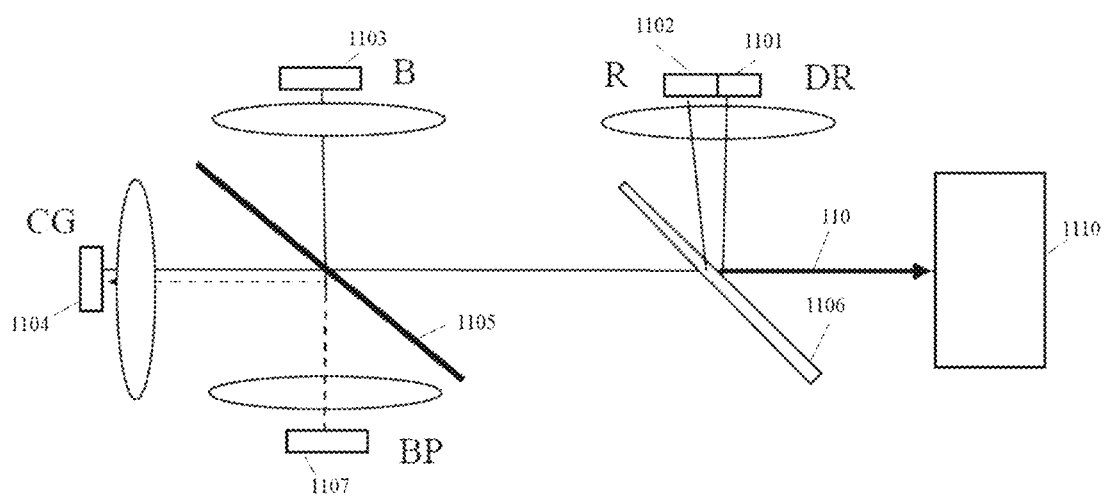
FIG. 12 illustrates another alternative embodiment of 4-channel light engine apparatus according to the present disclosure.

As another alternative embodiment of high brightness 4-channel light engine apparatus according to the present invention in FIG. 12, it comprises at least a long wavelength red LED 1101 with deep red(DR) peak wavelength of 640~660 nm, a short wavelength red LED 1102 with red-amber(R) peak wavelength around 620 nm, a converted green(CG) LED 1104, a blue pump(BP) LED 1107 and a blue(B) wavelength LED 1103, wherein, the deep red LED 1101 and the red-amber LED 1102 are packaged on a single substrate and be combined by a wedged dichroic mirror 1106 into co-axial light path 110. The converted green LED light from the converted green(CG) LED 1104 is pumped from bottom blue die and remoted top blue light from the blue pump(BP) LED 1107. The combined deep red/blue light/red light and the converted green light will be combined by a dichroic mirror 1105 to have co-axial light path 110 for a high brightness light engine configuration. The dielectric dichroic coating of the dichroic mirror 1105 comprises a short-pass dielectric coating. The dielectric dichroic coating of the wedged dichroic mirror 1106 comprises a short-pass dielectric coating which passes blue, green light and reflects red light. The co-axial light path RGB combined light will hit a fly-eye array lens 1110 for homogenization before illuminating micro-display panel by a condenser lens(not shown).

Figure 13:
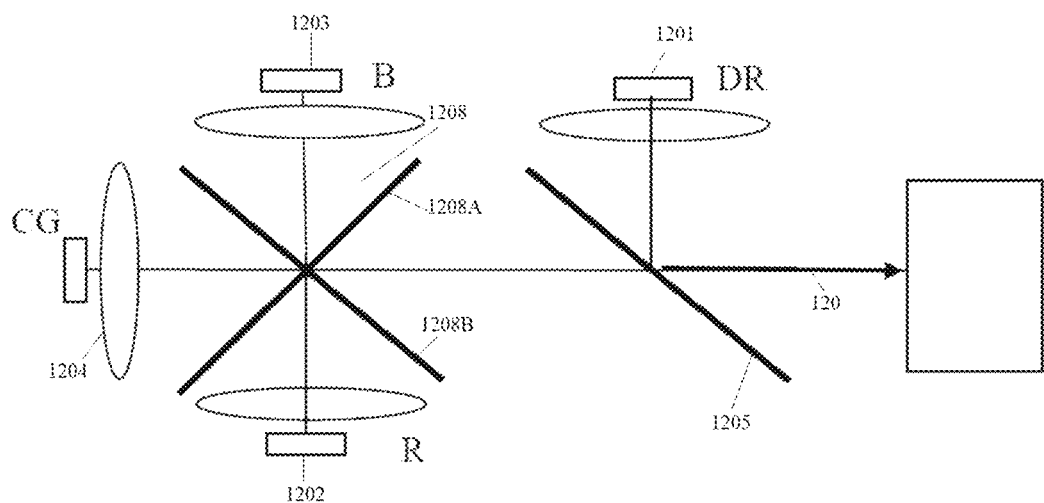
FIG. 13 illustrates another alternative embodiment of 4-channel light engine apparatus according to the present disclosure.
Figure 14:
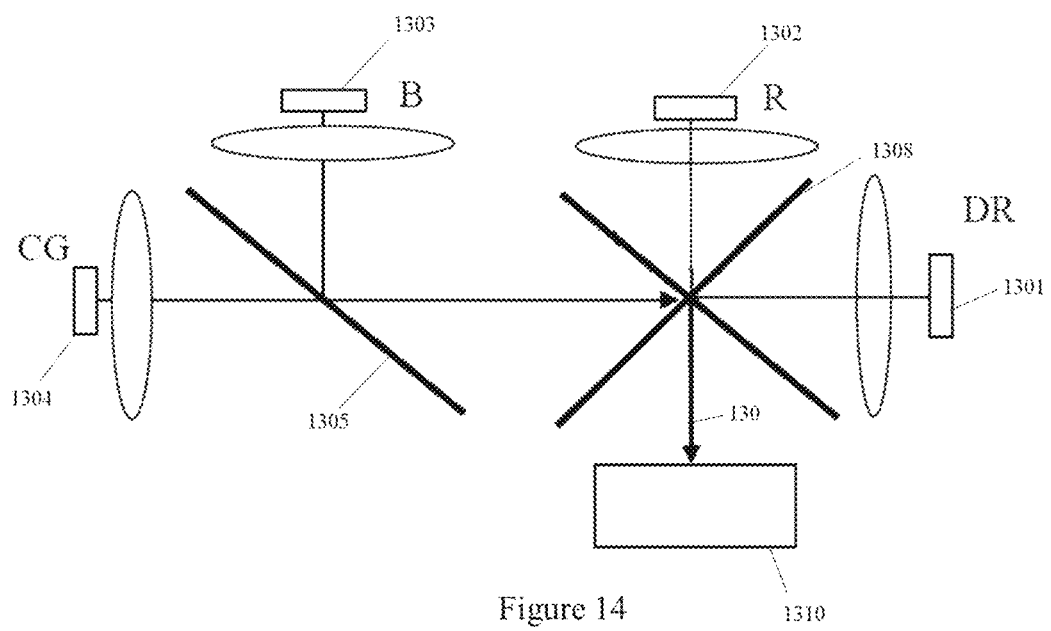
FIG. 14 illustrates another alternative embodiment of 4-channel light engine apparatus according to the present disclosure.

As another alternative embodiment of high brightness 4-channel light engine apparatus according to the present invention, it comprises at least a long wavelength red light source 1201 with deep red(DR) peak wavelength of 640~660 nm, a short wavelength red LED 1202 with red-amber(R) peak wavelength around 620 nm, a converted green(CG) light source 1204, and a blue wavelength light source 1203, wherein, the four light sources are packaged on four separated substrates, and combine by one X-plate dichroic mirror 1208 and one dichroic mirror 1205. As in FIG. 13, the convert green light, the blue light and the short wavelength red light are combined by the X-plate dichroic mirror 1208 and then combined with the deep red light by the dichroic mirror 1205 into a co-axial light path 120. The dielectric dichroic coating of the X-plate dichroic mirror 1208 comprises a short-pass dielectric coating red reflector mirror 1208A and a long-pass dielectric coating blue reflector mirror 1208B. The dielectric dichroic coating of the dichroic mirror 1205 comprises a short-pass dielectric coating to pass blue, green and red-amber light and reflect deep red light. In FIG. 14, the deep red LED light from the deep red light source 1301 and short red-amber light from red-amber light source 1302 are combined by a X-plate dichroic mirror 1308 and then combined with converted green and blue light from the converted green(CG) light source 1304 and a blue wavelength light source 1303 respectively into co-axial light path 130 without etendue increase.

Figure 15:
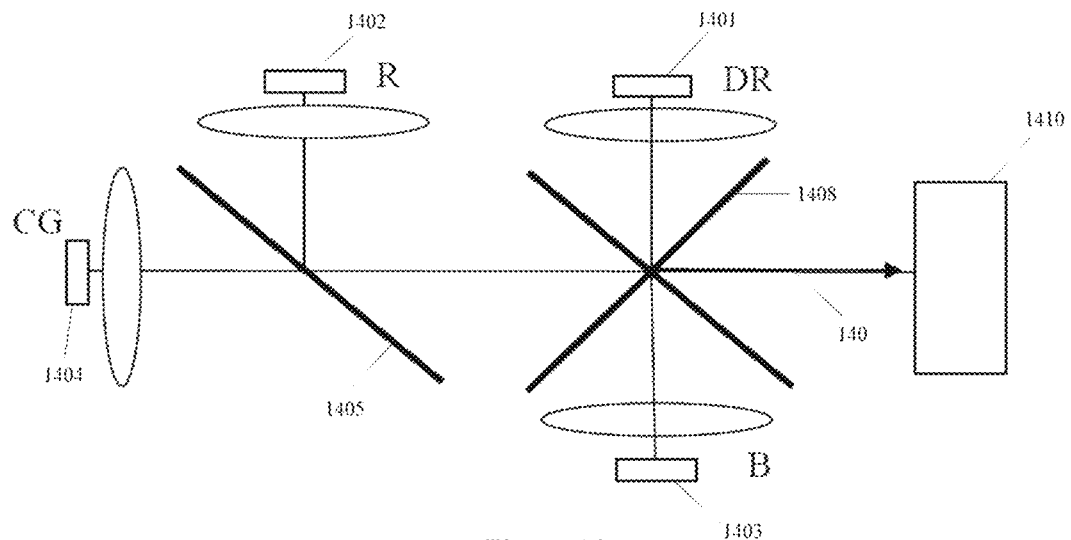
FIG. 15 illustrates another alternative embodiment of 4-channel light engine apparatus according to the present disclosure.

Another alternative embodiment of 4-channel light engine apparatus is illustrated in FIG. 15, wherein the converted green light from a converted green(CG) light source 1404 and a red-amber light from a short wavelength red LED 1402 are combined by a dichroic mirror 1405. The deep red light from a long wavelength red light source 1401 and blue light from a blue wavelength light source 1403 is combined by a X-plate dichroic mirror 1408 and then combined with by the combined converted green/red-amber light into co-axial light path 140 without etendue increase. The deep red light source could be a deep red LED or semiconductor laser. The converted green light source may be a green phosphor plate directly depositing on top of blue LED die, or converted green rod/pipe with multiple blue LED chips attached to the rod/pipe which have green phosphor coated on the surface. The combined deep red light/blue light/red-amber light and the converted green light will have co-axial light path 140 for a high brightness light engine configuration. The co-axial light path RGB combined light will hit a fly-eye array lens 1410 for homogenization before illuminating micro-display panel by a condenser lens(not shown).

Figure 16:
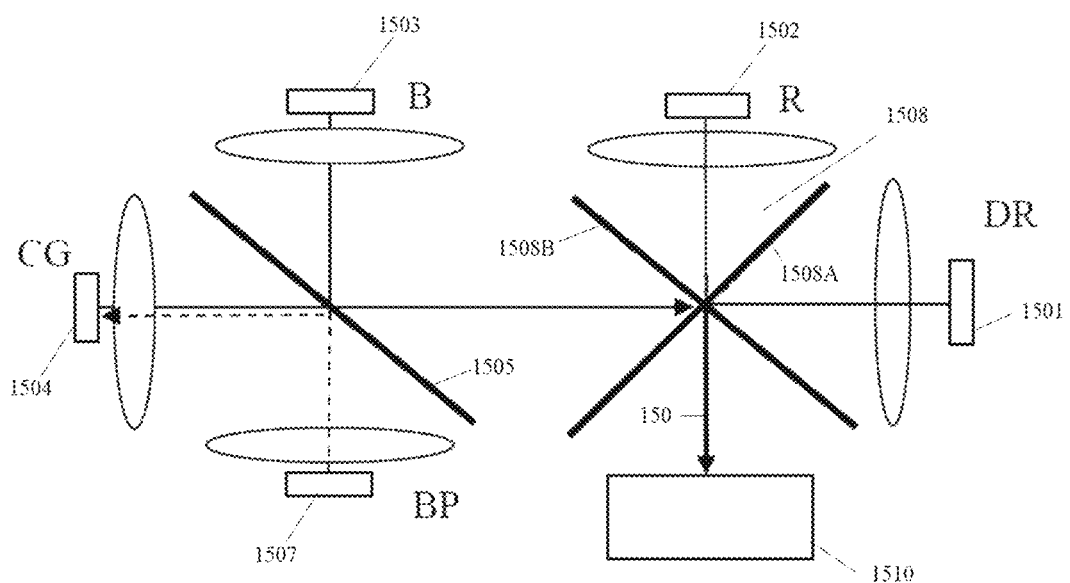
FIG. 16 illustrates an alternative embodiment of 5-channel light engine apparatus according to the present disclosure.
Figure 17:
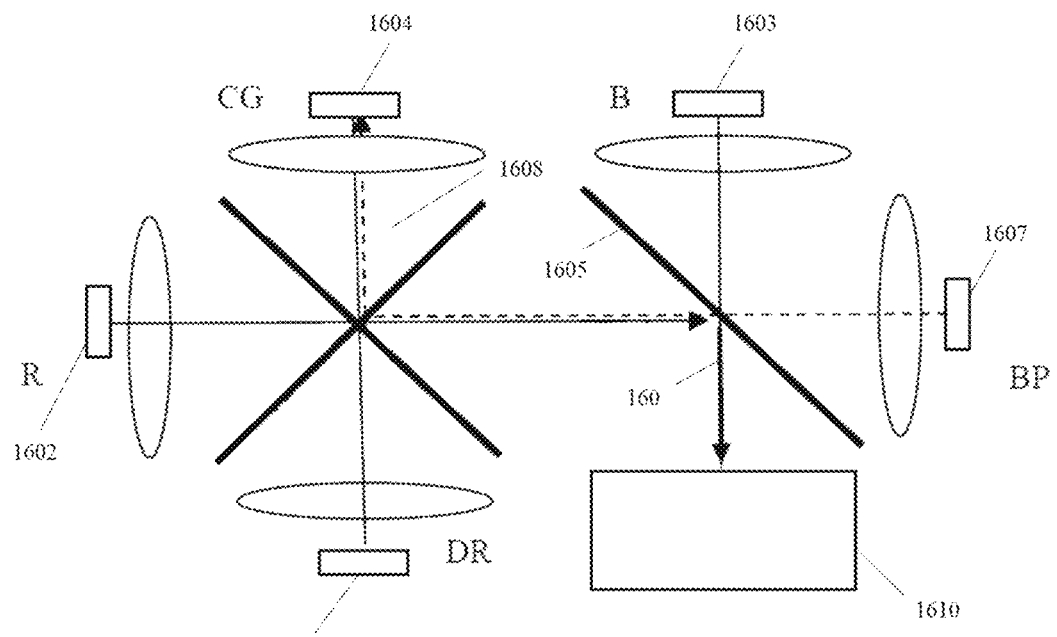
FIG. 17 illustrates another alternative embodiment of 5-channel light engine apparatus according to the present disclosure.
Figure 18:
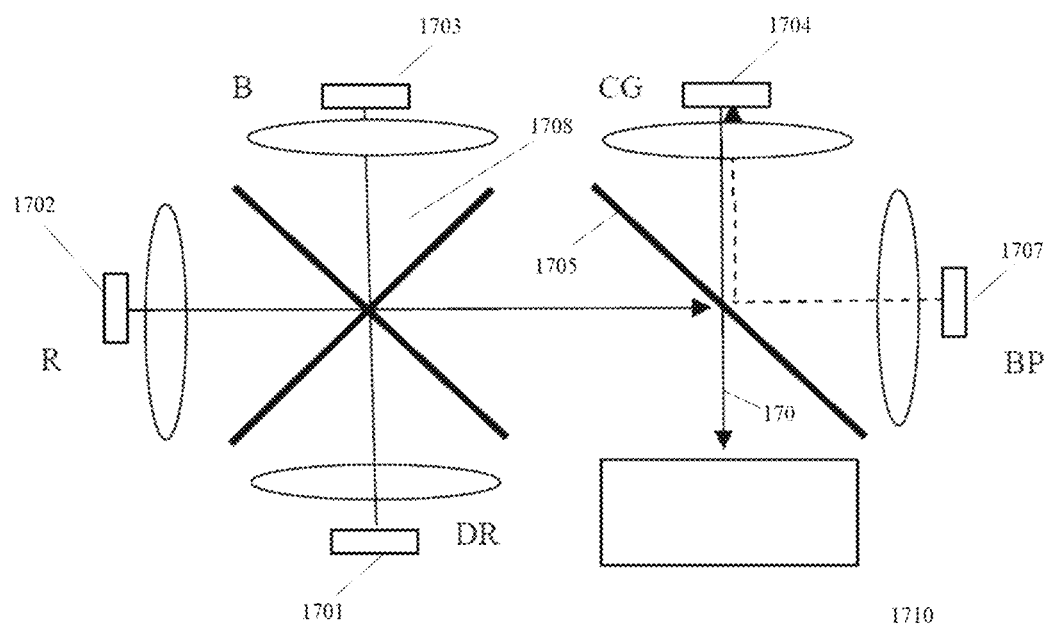
FIG. 18 illustrates another alternative embodiment of 5-channel light engine apparatus according to the present disclosure.

As an alternative embodiment of high brightness 5-channel light engine apparatus according to the present invention in FIG. 16, it comprises at least a long wavelength red LED 1501 with deep red(DR) peak wavelength of 640~660 nm, a short wavelength red LED 1502 with red-amber(R) peak wavelength around 620 nm, a converted green(CG) LED 1504, a blue pump(BP) LED 1507 and a blue(B) wavelength LED 1503, wherein, a X-plate dichroic mirror 1508 and a dichroic mirror 1505 are used to combine the 5 different spectrum light beams from the above 5 different light sources into a co-axial light path 150 without etendue increase. In FIG. 16, the converted green light, which is pumped from bottom blue die and remoted top blue light, and the blue light are combined by a dichroic mirror 1505 into co-axial light path; the deep red right and the red-amber light are combined by the X-plate dichroic mirror 1508 and then combined with mixing converted green/blue light into co-axial light path 150 and hit to a fly-eye array lens 1510 for homogenization before illuminating micro-display panel by a condenser lens. The dielectric dichroic coating of the dichroic mirror 1505 is a long-pass filter which reflects blue light, but passes through green and red light. The dielectric dichroic coating of the X-plate dichroic mirror 1508 includes a short-pass deep red reflector mirror 1508A and a long-pass blue and green reflector mirror 1508B. As an alternative, in FIG. 17, the converted green, which is pumped from bottom blue die of a converted green(CG) LED 1604 and top pumping blue light by a blue pump(BP) LED 1607, the red-amber light from a short wavelength red LED 1602, the deep red right from a long wavelength red LED 1601 are combined by a X-plate dichroic mirror 1608 and then combine with display blue light from a blue(B) wavelength LED 1603 by a dichroic mirror 1605 into a co-axial light path 160 and will hit a fly-eye array lens 1610 for homogenization before illuminating micro-display panel by a condenser lens. As another alternative, in FIG. 18, the display blue light from a blue(B) wavelength LED 1703, the red-amber light from a short wavelength red LED 1702 and the deep red light from a long wavelength red LED 1701 are combined by a X-plate dichroic mirror 1708, and then combined with converted green light, which is emitted from bottom blue die of a converted green(CG) LED 1704 and top pumped by a blue pump(BP) LED 1707, into co-axial light path 170 and hit a fly-eye array lens 1710 for homogenization. The X-plate dichroic mirror could be replaced by two dichroic mirrors in the apparatus.

Figure 19:
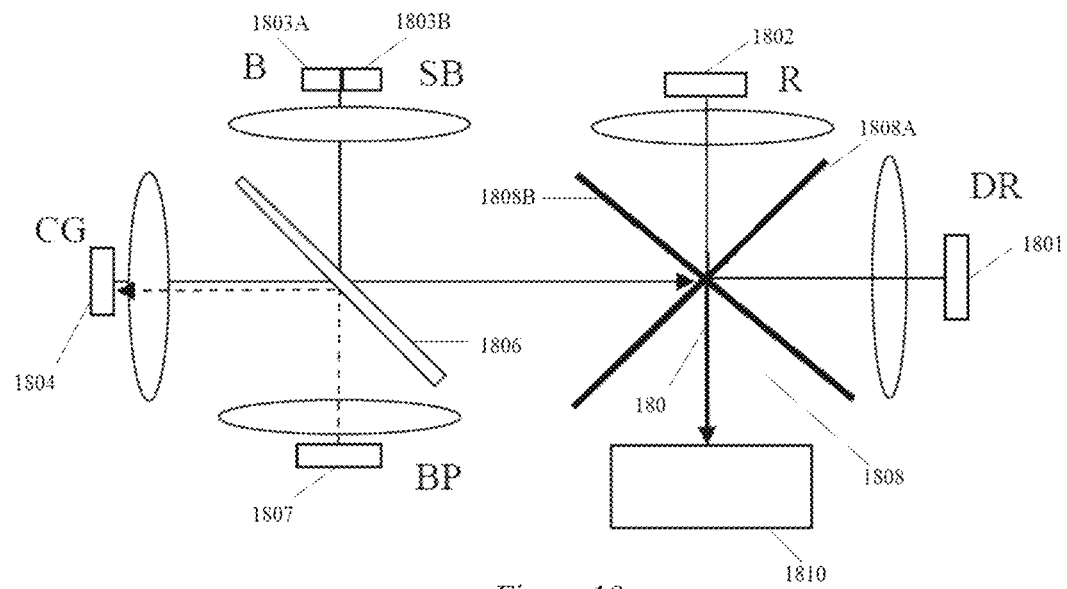
FIG. 19 illustrates another alternative embodiment of 5-channel light engine apparatus according to the present disclosure.

As another alternative embodiment of high brightness 5-channel light engine apparatus according to the present invention in FIG. 19, the blue wavelength LED may have long blue(LB) wavelength chip of 460~470 nm 1803A and short blue(SB) wavelength chip of 430~440 nm 1803B packaged on a same substrate and a wedged dichroic mirror 1806 is used to combine two different blue wavelength lights into a co-axial light path. The long blue and short blue light and a converted green light, which is pumped from bottom blue die of a converted green(CG) LED 1804 and remoted top blue light by a blue pump(BP) LED 1807, will be combined by a wedged dichroic mirror 1806, and then combined with the deep red light from a deep red (DR) LED 1801 and red-amber light from a red-amber (R) LED 1802 by a X-plate dichroic mirror 1808 into a co-axial light path 180 without etendue increase before hitting a fly-eye array lens 1810 for homogenization. The dielectric dichroic coating of the wedged dichroic mirror 1806 is a long-pass filter which reflects blue light, but passes through green and red light. The dielectric dichroic coating of the X-plate dichroic mirror 1808 includes a short-pass deep red reflector mirror 1808A and a long-pass blue and green reflector mirror 1808B. This 5-channel light engine can be driven at high current density over 4~6A/mm^2 for high brightness light engine output as high as 4000~5000 lm. In other aspects of 3-channel/4-channel/5-channel configuration include blue LED, the blue wavelength LED may include a long blue wavelength of 460 nm~470 nm and short wavelength blue of 430 nm~440 nm chip packaged on a same substrate.

Figure 20:
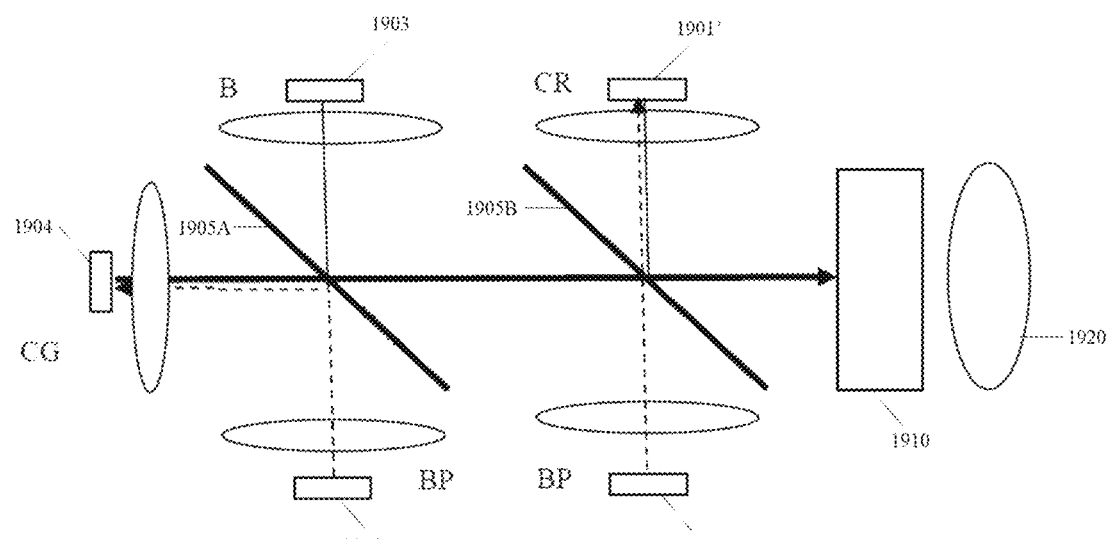
FIG. 20 illustrates another alternative embodiment of 5-channel light engine apparatus according to the present disclosure.

As another alternative embodiment of high brightness 5-channel light engine apparatus according to the present invention in FIG. 20, it comprises at least a converted red(CR) LED light source 1901', a converted green(CG) LED light source 1904, a display blue(B) wavelength light source 1903, a blue pump(BP) light source 1907 for top pump of green phosphor plate and a second blue pump(BP) light source 1907' for top pump of red phosphor plate, wherein, red phosphor plate may have long peak wavelength of 640~660 nm. The combined converted green light, the converted red light and the blue light will be combined by two dichroic mirrors 1905A,1905B into a co-axial light path, and then hit a fly-eye array lens 1910 for homogenization before illuminating micro-display panel by a condenser lens 1920. The dielectric dichroic coating of the dichroic mirror 1905A includes a long-pass filter which reflects blue, but passes through green and red light, while the dielectric dichroic coating of the dichroic mirror 1905B includes a short-pass filter which passes blue and green light, but reflects red light. The blue pump light source may be blue LED light source, or blue laser.

Figure 21:
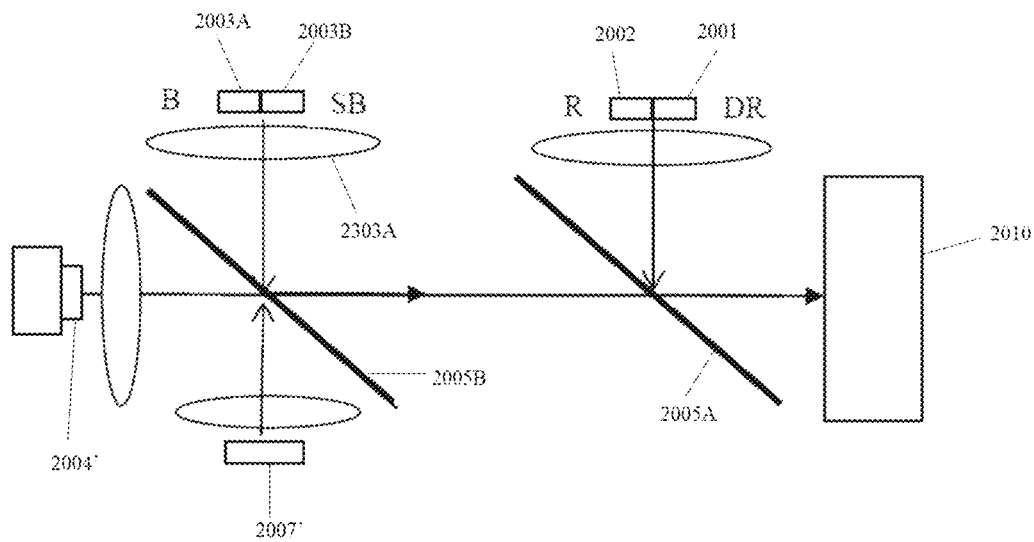
FIG. 21 illustrates the first embodiment of hybrid laser LED light engine apparatus according to the present disclosure.
Figure 22:
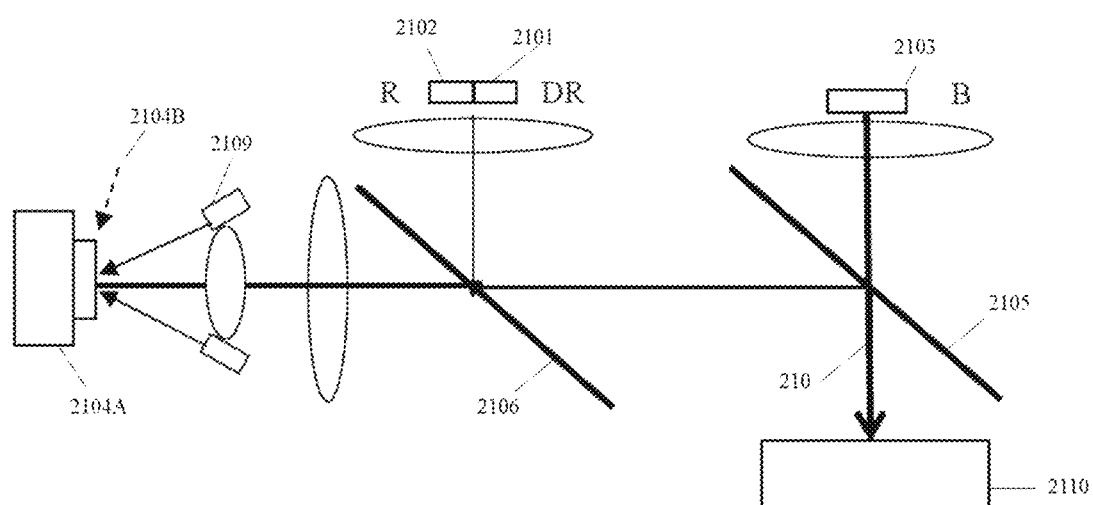
FIG. 22 illustrates an alternative embodiment of hybrid laser LED light engine apparatus according to the present disclosure.

As the first embodiment of a hybrid laser LED light engine apparatus according to the present invention, it comprises at least a long wavelength red light with deep red peak wavelength longer than 630 nm, at least a blue wavelength light, a converted green light and a top pump blue light to pump the converted green light device from the top of green phosphor platelet. Furthermore, at least one of deep red wavelength light and top pump blue light is emitted from a laser diode device. The red light, the converted green light and the blue light will be combined by beam combiners into co-axial light path without etendue increase for a high brightness light engine configuration. The beam combiners may be wedged dichroic mirror, X-plate dichroic mirror or a single dichroic mirror. As show in FIG. 21, the red light channel may comprise a long wavelength red LED 2001 with peak wavelength of 640~660 nm and a short wavelength red LED 2002 with red-amber peak wavelength around 620 nm, wherein the deep red LED 2001 and the red-amber LED 2002 are packaged on a single substrate and combined by a wedged dichroic mirror 2005A. The blue light channel may comprise a long blue LED 2003A with peak wavelength of 460~470 nm, a short blue(SB) LED 2003B with peak wavelength of 430~440 nm, wherein the long blue LED 2003A and the short blue LED 2003B are packaged on a single substrate and combined by a wedged dichroic mirror 2005B; and the top pump blue light is emitted from blue laser diodes, wherein the converted green light channel may comprise a green phosphor plate attached to a reflector surface 2004' and a blue laser light emitted from blue laser diodes 2007' pumping it from the top. The deep red LED and red-amber LED could be packaged at separate substrates and combined by X-plate dichroic mirror. As an alternative, shown in FIG. 22, The blue laser diode array module 2109 is configured to be in green light channel and incident on the green phosphor platelet 2104B at an angle from the top of the platelet. The converted green light from the laser top pumping will reflect at bottom mirror substrate 2104A and enter green light channel. The red light channel may comprise a long wavelength red LED 2101 with peak wavelength of 640~660 nm and a short wavelength red LED 2102 with red-amber peak wavelength around 620 nm, wherein the deep red LED 2101 and the red-amber LED 2102 are packaged on a single substrate and combined by a wedged dichroic mirror 2106. The combined red light, the green light and the blue light will be combined by a dichroic mirror 2105 into co-axial light path 210 without etendue increase for a high brightness light engine configuration with light engine output. The illumination light beam will be reflected by a micro-display and through optical prism to enter into projection optical system; wherein the projection light output can achieve high brightness light engine output as high as 5000 lm in a micro-display projection system.

Figure 23:
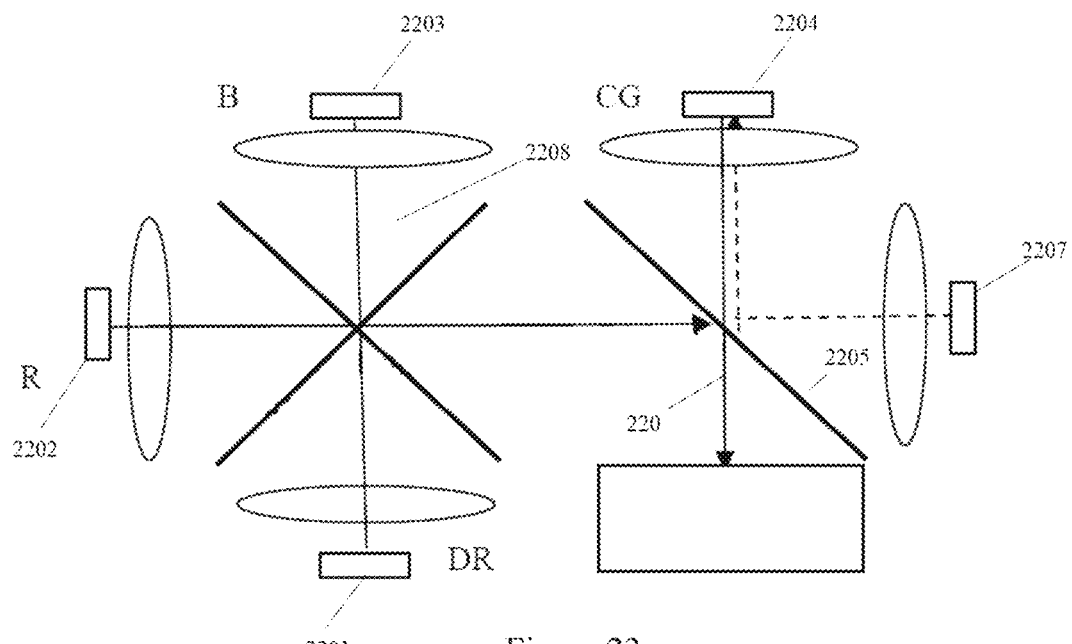
FIG. 23 illustrates another alternative embodiment of hybrid laser LED light engine apparatus according to the present disclosure.
Figure 24:
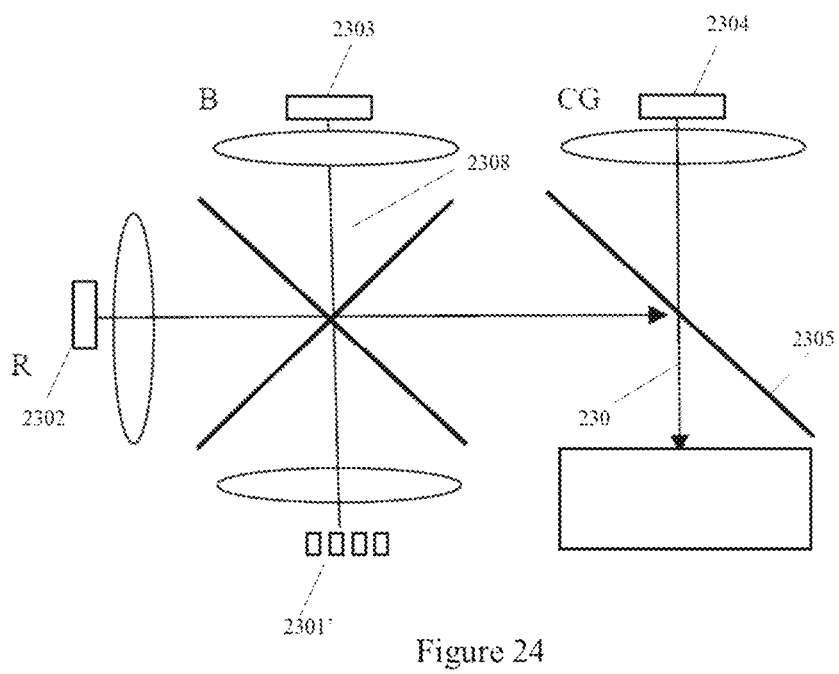
FIG. 24 illustrates another alternative embodiment of hybrid laser LED light engine apparatus according to the present disclosure.

As another alternative embodiment of a hybrid laser LED light engine apparatus according to the present invention, it comprises at least a long wavelength red light device with deep red peak wavelength longer than 630 nm, a short wavelength red LED with red-amber peak wavelength around 620 nm, a blue wavelength LED, a converted green LED and at least a green light channel or deep red channel comprise a laser diode. As in FIG. 23, it further comprises a blue laser 2207 channel to emit blue light beam and pump the converted green(CG) LED 2204 from the top of the CG platelet. The deep red LED 2201 and red-amber LED 2202 are combined by a X-plate dichroic mirror 2208. The combined red light, the converted green light and the blue light from a blue light source 2203 will be combined by a dichroic mirror 2205 into co-axial light path 220 without etendue increase for a high brightness light engine configuration. As in FIG. 24, the deep red light device 2301' is deep red laser diodes to emit the deep red light with peak wavelength longer than 630 nm, wherein the deep red laser light, the red-amber LED light from the red-amber LED 2302, the blue light from the blue LED 2303 and the converted green light from the CG LED 2304 will be combined a first X-plate dichroic mirror 2308 and a second dichroic mirror 2305 into co-axial light path 230 without etendue increase to achieve a light engine output as high as 5000 lm. The deep red light and red-amber light could be combined by two dichroic plates instead of X-plate dichroic mirror.

Figure 25:
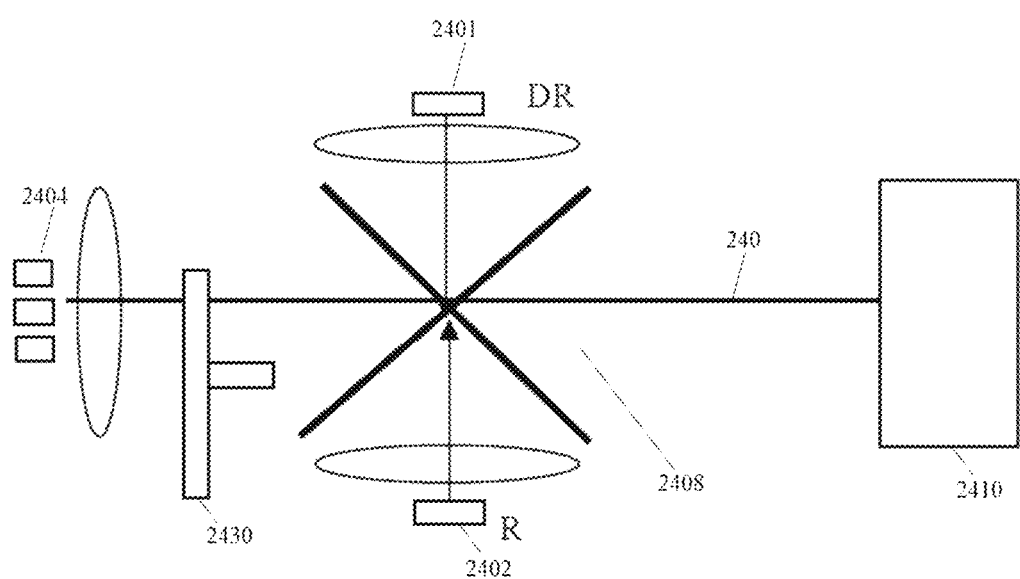
FIG. 25 illustrates another alternative embodiment of hybrid laser LED light engine apparatus according to the present disclosure.

As another alternative embodiment of a hybrid laser LED light engine apparatus according to the present invention as in FIG. 25, it comprises at least a long wavelength red LED 2401 with deep red peak wavelength longer than 630 nm, a short wavelength red LED 2402 with red-amber peak wavelength around 620 nm, at least a blue laser die 2404 to emit blue light, and converted green light wheel 2430 with green phosphor coated on rotation wheel, wherein, the deep red LED 2401 and red-amber LED 2402 are combined by a X-plate dichroic mirror 2408; and the converted green light channel having green phosphor coating on a rotation wheel 2430 and blue laser light pumps it from the bottom as transmitted light. The rotation color wheel 2430 has a green phosphor coated segment and blank segment, the ratio of green phosphor segment area and the blank segment area depend on the duty cycle of green light and blue light for color mixing in hybrid light engine. The blue light will hit the green phosphor segment from the bottom or the top to emit a transmitted converted green light or a reflected converted green light. The combined red light, the converted green from blue laser 2404 and the blue laser light pass through the blank segment of the color wheel will be combined by the X-dichroic mirror 2408 into co-axial light path 240 and will hit a fly-eye array lens 2410 for homogenization before illuminating micro-display panel by a condenser lens without etendue increase for a high brightness light engine configuration. As an alternative, the deep red light and red-amber light also could be combined by two dichroic plates. The deep red LED and red-amber LED could be packaged on the same substrate and the two red lights will be combined by wedged dichroic mirror. The blue laser light could pump the green phosphor segment from the top and green phosphor segment is a reflective segment.

As alternatives, the dichroic X-plate can be replaced by a dichroic X-cube or two dichroic mirrors having short-pass, long-pass or single band-pass filters; the deep red light source could be a deep red LED or semiconductor laser; the converted green light source may be a green phosphor plate directly depositing on top of blue LED die, or converted green rod/pipe with multiple blue LED chips attached to the rod/pipe which have green phosphor coated on the surface; the blue wavelength LED may have long blue(LB) wavelength chip of 460~470 nm 1803A and short blue(SB) wavelength chip of 430~440 nm 1803B packaged on a same substrate according to the required output brightness; the fly-eye array lens can be replaced by a mixing rod or mixing hollow pipe; and the blue pump light source may be blue LED light source, or blue laser. As such, the light engine apparatus can be modified so as to meet different requirements.

Embodiments described above illustrate but do not limit the invention. It should also be understood that numerous modifications and variations are possible in accordance with the principles of the invention. Accordingly, the scope of the invention is defined only by the following claims.

The invention claimed is:

1. A light engine device, comprising:
a first light source comprising a first green light device configured to emit a green light beam;
a second light source comprising a first blue light device configured to emit a blue light beam;
a third light source comprising a first red light device configured to emit a first red light beam with peak wavelength longer than 630 nm and a second red light device configured to emit a second red light beam with peak wavelength shorter than 630 nm; and
at least one beam combiner configured to combine the first red light beam, the second red light beam, the green light beam and the blue light beam so as to form a co-axial light path;
wherein the difference between the wavelength of the first red light beam and the wavelength of the second red light beam needs to have at least 25 nm to reduce dichroic mirror cutting loss.

2. The device of claim 1, wherein the at least one beam combiner comprises a first beam and a second beam combiner, wherein the first beam combiner comprises a X-plate dichroic mirror, a wedged dichroic mirror, or a dichroic X-cube, which has multiple-layers of dielectric coating to function as a short-pass dichroic mirror, a long-pass dichroic mirror or a single band-pass dichroic mirror; and
the second beam combiner configured to assist the first beam combiner in forming the co-axial light path, wherein the second beam combiner comprises at least one dichroic mirror;
the first beam combiner can be split into two dichroic mirrors as the first beam combiner and a third beam combiner, each including multiple layers dielectric coated plate; and
wherein the green light beam, the blue light beam, the first red light beam and the second red light beam will be combined by the first and second or third beam combiners into a co-axis light path without Etendue increase.

3. The device of claim 1, wherein the first red light device is a semiconductor LED to emit the first red wavelength light beam with peak wavelength between 640 nm and 660 nm, and the second red light device is a semiconductor LED to emit the second red wavelength light beam with peak wavelength less than 630 nm, wherein the combination of the first red light beam and the second red light beam can enhance the brightness of the red light beam and the duty cycle ratio between the green light beam, the enhanced red light beam and the blue light beam will be optimal balanced.

4. The device of claim 1, wherein the first red light device is a phosphor converted red LED with a red phosphor conversion plate directly depositing on top of a blue LED die, or a remotely phosphor conversion red light device with a red phosphor deposited on a high reflective and thermally conductive substrate and the blue light pump the red phosphor from the top side, and wherein the second light source further comprises a second blue LED with peak wavelength between 430 nm and 450 nm so as to pump the red phosphor conversion plate from the top of the red phosphor conversion plate.

5. The device of claim 1, wherein the first green light device is a converted green LED with a green phosphor platelet directly depositing on top of a blue LED die, or a remotely phosphor conversion green light device with a green phosphor deposited on a high reflective and thermally conductive substrate and the blue light pump the green phosphor from the top side, or a converted green rod/pipe with multiple blue LED dies attached to the rod/pipe which have green phosphor coated on a surface of the rod/pipe, and wherein the second light source further comprises a second blue LED with peak wavelength of 430~450 nm to top pump the green phosphor platelet or the surface of the rod/pipe by a blue light beam, which is reflected by the dichroic mirror and emitted from the second blue LED.

6. The device of claim 1, wherein the first blue light device and the first red light device can be laser light source or other semiconductor light device.

7. The device of claim 3, wherein the first beam combiner is the wedged dichroic mirror, and wherein the first red LED die together with the second red LED die or with the first blue LED die can be packaged on a single substrate and combined by the wedged dichroic mirror into a co-axis light path.

8. The device of claim 7, wherein the light beams from the first red LED die and another wavelength LED die packaged on the same substrate will enter into the same light channel for light collimation, but the two wavelengths light beams incident the wedged dichroic mirror at different angles and will be reflected by different sides of the wedged dichroic mirror, wherein the wedged dichroic mirror is configured to have a wedged angle, so that the principle axis of two wavelength light beams after being reflected from two different sides of the wedged dichroic mirror will be overlap into a co-axis light path without etendue increase.

9. The device of claim 1, further comprising a fly-eye array lens and a condenser lens, wherein a combined light beam from the co-axial light path hits the fly-eye array lens for homogenization and is then condensed by the condenser lens to illuminate the micro-display panel at a certain required angle.

10. The device of claim 1, further comprising a mixing rod or mixing hollow pipe and a condenser lens, wherein a combined light beam from the co-axial light path hits the mixing rod or mixing hollow pipe for homogenization and is then condensed by the condenser lens to illuminate the micro-display panel at a certain required angle.

11. The device of claim 9, wherein the illumination light beam will be reflected by micro-display and through optical prism to enter into a projection optical system;
wherein the projection light output from the projection optical system can achieve high brightness light engine output as high as 5000lm in a micro-display projection system.

12. A multi-channel light engine apparatus for illumination system, comprising:
a first light channel with collimation optics, wherein the first light channel comprises at lease a first converted green LED;
a second light channel with collimation optics, wherein the second light channel comprises at least a first blue LED;
a third light channel with collimation optics, wherein the third light channel comprises at least a first long wavelength red LED having a peak wavelength longer than 630 nm;
a first beam combiner, wherein the first beam combiner comprises a X-plate dichroic mirror, a wedged dichroic mirror or a dichroic X-cube;

wherein the first, second and third light channels are arranged so as to facilitate the multiple layers dielectric coating of at least the first beam combiner to be function as a short-pass, a long-pass or a single band-pass filter; and wherein a first light beam from the first light channel, a second light beam from the second light channel and a third light beam from the third light channel are combined into a co-axial light path by at least a first beam combiner; and the combined light beam from the co-axial light path hits the fly-eye array lens for homogenization and is then condensed by a condenser lens for illumination system.

13. The multi-channels light engine apparatus of claim 12, further comprising a second short wavelength red LED having a peak wavelength shorter than 630 nm, wherein the first long wavelength red LED die and the second short wavelength red LED die, or the first long wavelength red LED die and the first blue LED die can be packaged on the same substrate, and combined by a wedged dichroic mirror into a co-axis light path.

14. The multi-channels light engine apparatus of claim 13, further comprising a second beam combiner configured to assist the first beam combiner in forming the co-axial light path, wherein the second beam combiner comprises at least one dichroic mirror; and wherein, the green light beam, the blue light beam and red light beam will be combined by the first and second beam combiners into a co-axis light path without Etendue increase for light engine output as high as 3000lm in a micro-display projection system.

15. The multi-channels light engine apparatus of claim 12, further comprising:
a fourth light channel with collimation optics, wherein the fourth light channel comprises at least a second blue LED; wherein the second blue LED having peak wavelength no longer than the peak wavelength of the first blue LED, a blue light beam from the fourth light channel is used to remotely pump the green phosphor platelet on the converted green LED of the first light channel from the top of the platelet and the top pumped downward green light will be reflected at the reflective layer of LED die of the converted green LED and combine together with the bottom pumping converted green LED light and then enter into the collimation optics of the first light channel;
wherein the first light beam, the second light beam, the third light beam and the fourth blue pump light beam are combined into a co-axial light path by the first beam combiner and a second beam combiner; and the second beam combiner comprises a single dichroic mirror; and the combined light beam from the co-axial light path hits fly-eye array lens for homogenization and then condensed by a condenser lens for illumination system.

16. The multi-channels light engine apparatus of claim 15, further comprising a second short wavelength red LED having a peak wavelength shorter than 630 nm, wherein the first long wavelength red LED and the second short wavelength LED can be packaged on the same substrate and combined by a wedged dichroic mirror into a co-axial light path.

17. The multi-channels light engine apparatus of claim 12, further comprising:
a fourth light channel with collimation optics, wherein the fourth light channel comprises at least a second short wavelength red LED having a peak wavelength shorter than 630 nm;

Wherein the first light beam, the second light beam, the third light beam and the fourth light beam from the fourth light channel are combined into a co-axial light path by a first beam combiner and a second beam combiner, wherein the first beam combiner comprises a X-plate dichroic mirror or a dichroic X-cube; and the second beam combiner comprises a single dichroic mirror; and Wherein the combined light beam from the co-axial light path hits fly-eye array lens for homogenization and then condensed by a condenser lens to illuminate a micro-display panel for light engine output as high as 4000lm in a micro-display projection system.

18. The multi-channels light engine apparatus of claim 17, further comprising:
a fifth light channel with collimation optics, wherein the fifth light channel comprises at least a second blue LED; wherein the second blue LED having peak wavelength no longer than the peak wavelength of the first blue LED, the blue light beam from the fifth light channel is used to remotely pump the green phosphor platelet on the converted green LED of the first light channel from the top of the platelet and the top pumped green light will be reflected at reflective layer of LED die of the converted green LED and combine together with the bottom pumping converted green LED light and then enter into the collimation optics of the first light channel;
the first light beam, the second light beam, the third light beam, the fourth light beam and the fifth blue pump light beam are combined into a co-axial light path by the first beam combiner and a second beam combiner; wherein the second beam combiner comprises a single dichroic mirror; and
Wherein the combined light beam from the co-axial light path hits the fly-eye array lens for homogenization and is then condensed by a condenser lens to illuminate a micro-display panel for light engine output as high as 5000lm in a micro-display projection system.

19. The multi-channels light engine apparatus of claim 12, wherein the second light channel comprises a first blue LED and a second blue LED; and wherein the first blue LED die with a peak wavelength of 460~470 nm and the second blue LED die with a short peak wavelength of 430~440 nm, packaged together on the same substrate and combined by a wedged dichroic mirror into the co-axial light path.

20. The multi-channels light engine apparatus of claim 12, further comprising:
a third light channel comprises a phosphor converted red LED, with a red phosphor platelet directly depositing on top of a blue LED die, to emit a long wavelength red light with peak wavelength longer than 630 nm;
a fourth light channel with collimation optics, wherein the fourth light channel comprises at least a second blue LED; wherein the second blue LED having peak wavelength no longer than the peak wavelength of the first blue LED, the second blue light beam from the fourth light channel is used to remotely pump the green phosphor platelet on the converted green LED of the first light channel from the top of the platelet and the top pumping converted green light will be reflected at reflective layer of LED die of the converted green LED and combine together with the bottom pumping converted green LED light and then enter the collimation optics of the first light channel;
a fifth light channel with collimation optics, wherein the fifth light channel comprises at least a third blue LED, wherein the third blue light beam from the fifth light channel is used to remotely pump the red phosphor platelet on a converted red LED of the third light channel from the top of the red phosphor platelet and the top pumping converted red light will be reflected at reflective layer of LED die of the converted red LED and combine together with the bottom pumping converted red LED light and then enter into the collimation optics of the third light channel; and wherein the first green light beam, the first blue light beam, the first red light beam, the second blue pump light beam and the third blue pump light beam are combined into a co-axial light path by the first beam combiner and a second beam combiner; and the combined light beam from the co-axial light path hits the fly-eye array lens for homogenization and is then condensed by a condenser lens for illumination system.

21. A hybrid laser LED light engine device for high brightness light engine illumination system, comprising:
   a first light source comprising at least a first green light device configured to emit a green light beam;
   a second light source comprising at least a first blue light device configured to emit a blue light beam;
   a third light source comprising at least a first red light device configured to emit a first red light beam with peak wavelength longer than 630 nm; and
   at least a first beam combiner configured to combine the first red light beam, the green light beam and the blue light beam so as to form a co-axial light path, and the combined light beam from the co-axial light path hits the fly-eye array lens for homogenization and is then condensed by a condenser lens to illuminate a microdisplay panel;
   wherein the first beam combiner comprises a X-plate dichroic mirror, a wedged dichroic mirror, two dichroic mirrors or a dichroic X-cube, which has multiple-layers dielectric coating to be function as a short-pass dichroic filter, a long-pass dichroic filter or a single band-pass dichroic filter; and
   wherein at least one of the first, the second and the third light sources comprises at least a laser diode configured to emit a laser beam.

22. The hybrid laser LED light engine device of claim 21, further comprising:
   wherein the second light source further comprises a second blue light device configured to emit a blue laser beam; wherein the first green device having a green phosphor platelet directly deposited on a reflective mirror with good thermal conductive substrate, wherein the blue laser beam remotely pumping the green phosphor platelet from the top of the green phosphor platelet;
   Wherein, the first red light beam, the green light beam, the blue light beam and the blue laser beam are combined into a co-axial light path by the first beam combiner and a second beam combiner; and the second beam combiner comprises a single dichroic mirror.

23. The hybrid laser LED light engine device of claim 22, wherein the first blue light device comprises a long wavelength blue LED having a peak wavelength of 460~470 nm and a short wavelength blue LED having a short peak wavelength of 430~440 nm, packaged on the same substrate and combined by a wedged dichroic mirror into a co-axial light path.

24. The hybrid laser LED light engine device of claim 22, wherein the first red light device is a long wavelength red LED having a peak wavelength of 640~660 nm, and the third light source further comprises a short wavelength red LED having a peak wavelength shorten than 630 nm, packaged on the same substrate and combined by a wedged dichroic mirror into co-axial light path.

25. The hybrid laser LED light engine device of claim 22, further comprising a fourth light source configured to emit a second red LED light beam with a peak wavelength shorter than 630 nm; wherein the first red light beam and the second red LED light beam are combined by a X-plate dichroic mirror into co-axial light path; wherein the first green device is a converted green LED and the blue laser beam is top pumping the green phosphor platelet of the converted green LED.

26. The hybrid laser LED light engine device of claim 21, further comprising:
   a fourth light source comprises a second red LED configured to emit a short wavelength second red light beam having a peak wavelength shorter than 630 nm;
   wherein the first red light device is red laser diode; the first red light beam, the green light beam, the blue light beam and the short wavelength second red light beam are combined into a co-axial light path by the first beam combiner and a second beam combiner; wherein the second beam combiner comprises a single dichroic mirror.

27. A hybrid laser LED light engine device of claim 21, wherein the first light source further comprising:
   a color wheel, wherein the color wheel having green phosphor segments and blank segments, wherein the green phosphor segments are configured to emit a green light beam when pumped by the blue light beam, wherein the area of segments defines the duty cycle for blue, green turning on time in a period;
   the second light source comprising blue laser diodes to emit the blue laser beam with a peak wavelength of 440~470 nm after passing the blank segments of the color wheel;
   the first red light device comprising a first long wavelength red LED to emit the first red light beam with a peak wavelength of 640~660 nm;
   wherein the blue laser beam will hit the green phosphor segment from the bottom or the top to emit a transmitted converted green light or a reflected converted green light, which combine with the blue light that go through the blank segment of the color wheel and the first long wavelength red LED light beam by at least a first beam combiner into a co-axial light path without etendue increase.

28. The hybrid laser LED light engine device of claim 27, further comprising a fourth light source to emit a second red LED light beam with a peak wavelength shorter than 630 nm; wherein the first red light beam, the second red LED light beam and the blue/green light beam will be combined by a X-plate dichroic mirror or dichroic X-cube into a co-axial light path without etendue increase.

* * * * *